(12) United States Patent
Poykko et al.

(10) Patent No.: US 7,751,827 B2
(45) Date of Patent: Jul. 6, 2010

(54) METHOD AND SYSTEM FOR ESTIMATING THE POSITION OF A MOBILE DEVICE

(75) Inventors: Sami Poykko, Espoo (FI); Maurizio Spirito, Turin (IT)

(73) Assignee: Nokia Corporation, Espoo (FI)

( * ) Notice: Subject to any disclaimer, the term of this patent is extended or adjusted under 35 U.S.C. 154(b) by 250 days.

(21) Appl. No.: 10/526,400

(22) PCT Filed: Sep. 6, 2002

(86) PCT No.: PCT/IB02/03644
§ 371 (c)(1), (2), (4) Date: Mar. 2, 2005

(87) PCT Pub. No.: WO2004/023155
PCT Pub. Date: Mar. 18, 2004

(65) Prior Publication Data
US 2005/0267677 A1    Dec. 1, 2005

(51) Int. Cl.
*H04W 24/00* (2009.01)
(52) U.S. Cl. .................................. 455/456.1; 455/456.5
(58) Field of Classification Search ....... 455/456.1–457, 455/403; 342/357.1
See application file for complete search history.

(56) References Cited

U.S. PATENT DOCUMENTS

| | | | |
|---|---|---|---|
| 5,844,522 A * | 12/1998 | Sheffer et al. ................ | 342/457 |
| 6,002,936 A | 12/1999 | Roel-Ng et al. | |
| 6,014,564 A * | 1/2000 | Donis et al. .................. | 455/436 |
| 6,112,082 A | 8/2000 | Almgren et al. | |
| 6,208,290 B1 | 3/2001 | Krasner | |
| 6,275,186 B1 * | 8/2001 | Kong .......................... | 342/363 |
| 6,295,454 B1 * | 9/2001 | Havinis et al. ............ | 455/456.3 |
| 6,477,379 B2 * | 11/2002 | Kingdon .................. | 455/456.1 |
| 6,950,661 B2 * | 9/2005 | Watanabe et al. ......... | 455/456.1 |
| 2003/0119524 A1 * | 6/2003 | Carlsson ...................... | 455/456 |

FOREIGN PATENT DOCUMENTS

| | | |
|---|---|---|
| CN | 1212802 | 3/1999 |
| CN | 1220069 | 6/1999 |
| CN | 1360804 | 7/2002 |
| EP | 1 030 531 A1 | 8/2000 |
| WO | WO 02/03093 A1 | 1/2002 |

OTHER PUBLICATIONS

3GPP TS 29.229 V5.12.0 (Jun. 2006), 3rd Generation Partnership Project; Technical Specification Group Core Network; Cx and Dx interfaces based on the Diameter protocol detail (Release 5).
3GPP TS 2.228 V7.8.0 (Dec. 2007), 3rd Generation Partnership Project; Technical Specification Group Core Network and Terminals; IP Multimedia (IM) Subsystem Cx and Dx interfaces; Signalling flows and message contents (Release 7).
CN Office Action, application No. 028295617, date of notification Aug. 3, 2007, English language text portion of the office action, a total of 8 pages.

* cited by examiner

*Primary Examiner*—George Eng
*Assistant Examiner*—Nam Huynh
(74) *Attorney, Agent, or Firm*—Squire, Sanders & Dempsey L.L.P.

(57) ABSTRACT

A method of estimating the location of a mobile device, comprising the steps of: collecting location information; selecting at least one of a plurality of different location methods to provide a location estimate; and providing a location estimate based on the at least one selected location method.

28 Claims, 12 Drawing Sheets

Example of antenna gain

Fig. 6 Plots of radiation patterns approximated with the $\cos^2 x$-law. Notice that in the figures the functions $-AP(\theta)$ are depicted.

Fig. 7 Okumura-Hata Path-loss at 900MHz for different environments.

D from Cell Identity (and Timing Advance) of serving cell

D defined from Cell Identity of cells involved

Analytical definition for $D_i$

Plot of $f(x,y|z^i)$ in equation (30) for different values of path-loss/attenuation.

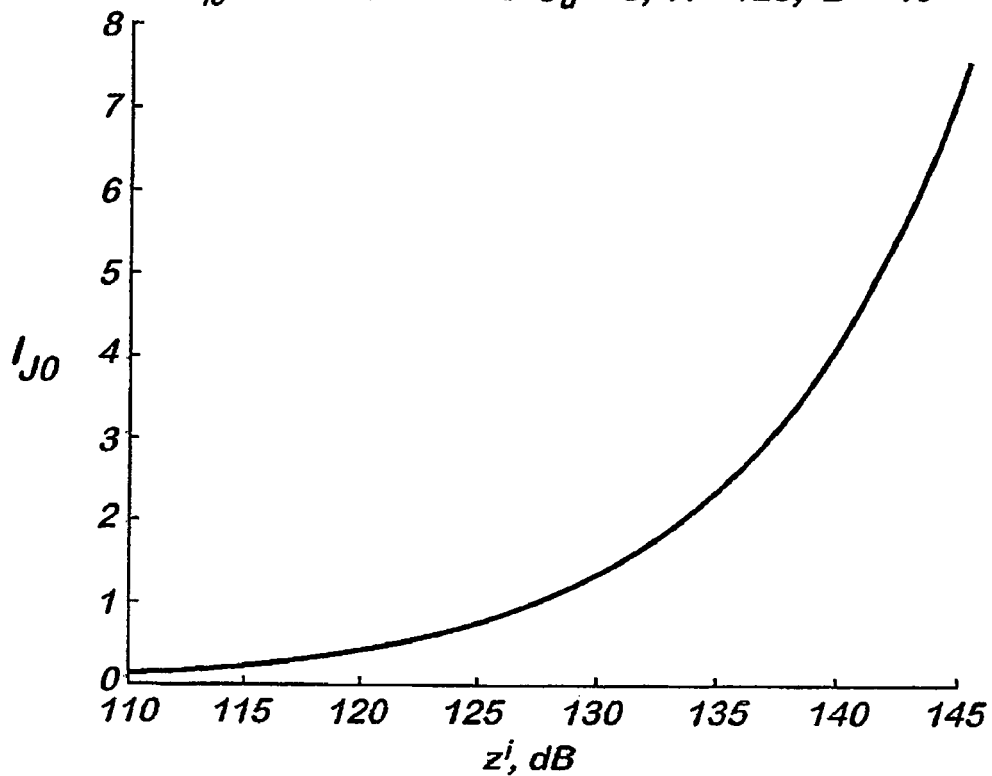
Fig. 12 Plots of $I_{j0}$ in equation (45) as a function of path-loss/attenuation
$I_{j0}$ as a function of $z^i$ $\sigma_u^i = 8$, $A^i = 125$, $B^i = 40$
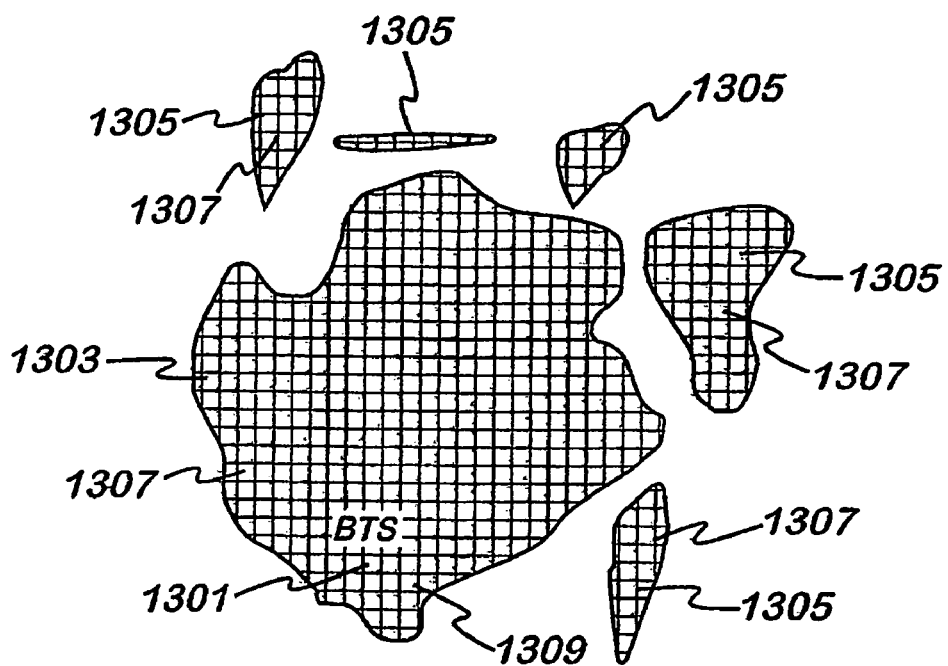
Fig. 13 Example of serving area

*The constant-TA circular crown defined in equation (54)*

*Definition of estimate of distance and its confidence interval*

Geometry used for calculating the confidence region in the Classic CI Location Algorithm when the serving cell is sectorized. The origin of the confidence region is at $(x_0, y_0)$. The angular width of the confidence region is $\beta = 2\Delta\phi_S'$.

METHOD AND SYSTEM FOR ESTIMATING THE POSITION OF A MOBILE DEVICE

FIELD OF THE INVENTION

The present invention relates to a location method and in particular but not exclusively to a method of determining the, location of a mobile station in a wireless communications network.

BACKGROUND OF THE INVENTION

Wireless cellular communication networks are known. In these networks, the area covered by the network is divided into a number of cells. Each of the cells has associated with it a base transceiver station. The base transceiver stations are arranged to communicate with mobile devices located in the cells. The mobile devices can take any suitable form and are typically mobile telephones.

The need for efficient accurate positioning of the mobile telephones has increased. In the USA, network operators must be able to provide the location of mobile subscribers making emergency calls. Similar proposals are currently being considered in Europe. Additionally, commercial services such as tracking services (that is the emergency service mentioned above, people locating, valuable assets location etc), finding/guidance services (proximity services such as yellow pages, direction indicators, point of interest locators etc) and notification services (targeted advertisements, traffic alerts, weather alerts, bus/train location, guided tours etc) are currently being proposed.

In the GSM (global system for mobile communications) standard, four positioning methods have been included: cell identity and timing advance, time of arrival, enhanced observed time difference (E-OTD) and a method based on GPS (global positioning system technology either as standalone GPS or assisted GPS).

The time of arrival method is able to locate handsets with standard software but requires the installation of new network elements such as location measurement units at every base station site. The enhanced—observed time difference method requires the installation of location management units at every two to five base transceiver stations and a software modification in the handset. The assisted GPS method requires installation of a GPS receiver and possibly also location measurement units besides the integration of a GPS receiver into a handset. All of these methods require the introduction of a new network element or corresponding functionality responsible for location calculation called the serving mobile location centre SMLC.

The timely deployment of location services for all users including those having handsets which do not include the necessary software or hardware, requires that measurements already available in cellular networks should be used. These techniques are important as they allow operators and service providers to start offering location based services to all customers with minimal additional costs whilst waiting for more accurate and sophisticated location technologies to be available. From the technical point of view, even when technology such as enhanced-observed time difference and assisted GPS are fully available, network based software solutions will still be needed as backup methods when the new standardised solutions fail or when the requested accuracy can be met with such a method. Network based software techniques can also be used as an initial guess for the algorithms used to implement one of the standard solutions in order to improve the accuracy or speed of convergence of those algorithms.

SUMMARY OF THE INVENTION

According to a first aspect of the present invention, there is provided a method of estimating the location of a mobile device, comprising the steps of: collecting location information; selecting at least one of a plurality of different location methods to provide a location estimate; and providing a location estimate based on the at least one selected location method.

According to a second aspect of the present invention, there is provided a system for estimating the location of a mobile device, comprising: means for collecting location information; means for selecting at least one of a plurality of different location methods to provide a location estimate; and means for providing a location estimate based on the at least one selected location method.

BRIEF DESCRIPTION OF DRAWINGS

For a better understanding of the present invention and as to how the same may be carried into effect, reference will now be made by way of example only to the accompanying drawings in which:

FIG. 12 shows a plot of $I_{i0}$ against path loss/attenuation in a wireless cellular network as shown in FIG. 1.

FIG. 13 shows an example of the serving area of a cell in a wireless cellular network as shown in FIG. 1.

DETAILED DESCRIPTION OF EMBODIMENTS OF THE PRESENT INVENTION

Figure 1:
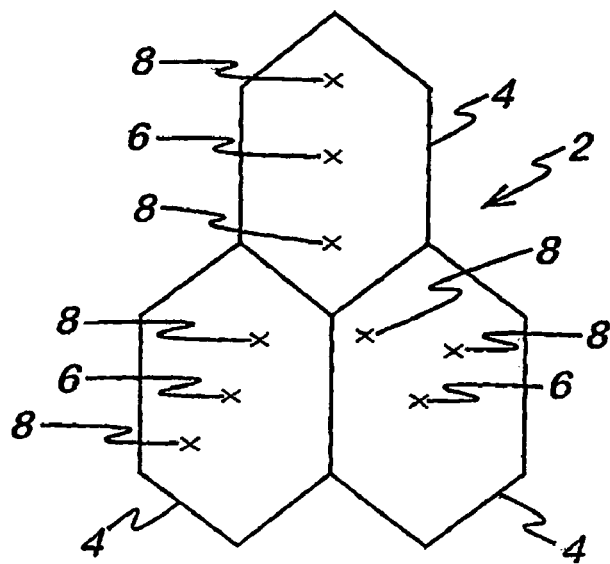
FIG. 1 shows wireless cellular network to which embodiments of the present invention can be applied.

Reference is made to FIG. 1 which shows schematically a wireless telecommunications network 2 to which embodiments of the present invention can be applied. The area covered by the network is divided up into cells 4. Associated with each cell is a base station 6. In other embodiments of the invention base stations 6 may be typically referred to as base transceiver stations (BTS). The base stations 6 are arranged to communicate with user equipment 8 via a wireless connection. The user equipment is typically a mobile device such as a mobile telephone, a computer, a personal digital assistant (PDA) or the like. In other embodiments of the invention the user equipment may also be typically referred to as a mobile station (MS).

Embodiments of the present invention are arranged to estimate the location of a mobile device (MS) and an associated confidence region. The confidence region is the region in which the mobile device (MS) can be expected to be located with a given probability. In other words, an estimated position of the mobile device (MS) can be calculated but that estimate will not be 100% accurate. The confidence region defines an area in which it is possible to be reasonably certain that the mobile device (MS) is located.

Embodiments of the present invention are arranged to combine a number of location algorithms which will be described in more detail hereinafter.

The location algorithms used in embodiments of the present invention use cell identity (CI), timing advance (TA) and received signal strength (RX) measurements. Preferred embodiments use three types of algorithms:

1) algorithms based on the cell identity. These are referred to as CI algorithms;
2) algorithms based on the cell identity and timing advance information. These are referred to as CI+TA algorithms; and
3) algorithms based on the cell identity and received signal strength measurements. These are referred to as CI+RX algorithms.

These different algorithms will be described in more detail hereinafter. For convenience these algorithms are divided into two categories. The first includes the CI+RX algorithms and the second includes the other two types of algorithm, that is CI and CI+TA algorithms.

It should be appreciated that in some networks, for example the GSM network, the cell identity, timing advance and received signal strength data is already available and used for other purposes. This means that at least some of the algorithms can be implemented without requiring any modification to the existing handsets.

The location algorithms used in embodiments of the present invention require a certain set of simultaneous equations to be solved. The simultaneous equations, depending on the statistical assumptions of the measurements can be non-linear or linear in the unknowns. If the equations are non-linear an iterative method has to be adopted to find a solution while if the simultaneous equations are linear, a solution in closed form exists. Closed form algorithms are computationally lighter than iterative algorithms.

CI+RX Algorithms

The class of algorithms based on the cell identity and received signal strength will now be described.

Figure 2:
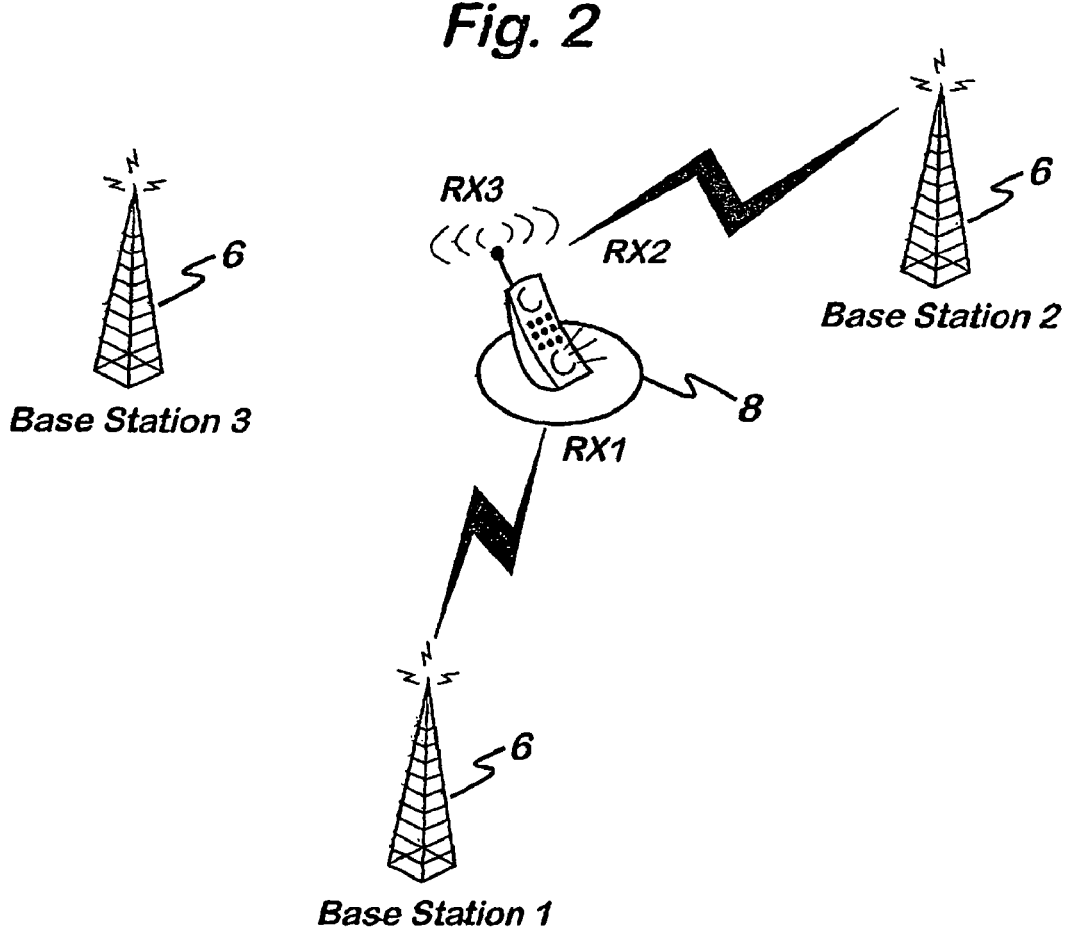
FIG. 2 shows a mobile device served by three base transceiver stations in a wireless cellular network as shown in FIG. 1.

Reference is made to FIG. 2 which shows the principles of location estimates based on received signal strength. Received signal levels are measurements of the levels of received signals from the serving base transceiver station (BTS) 6 (the base transceiver station (BTS) With which the mobile device (MS) 8 is associated) and the six strongest neighbours. Of course other numbers of base transceiver stations can be used. These measurements are performed by the mobile device (MS) 8 and reported to the fixed part of the network when the mobile device (MS) 8 is in a dedicated mode. In the idle mode, the mobile device 10 measures the received signal level from the best server, that is the base transceiver station (BTS) on which it is camped and the six strongest neighbours. However, these measurements cannot be reported to the fixed part of the network as there is no connection with any of the base transceiver stations.

The level received by a mobile device or more precisely attenuation that the received signal has experienced, depends on the reciprocal position of the mobile device and base transceiver station involved. The received signal level from multiple base transceiver stations can then be combined to estimate the location of the mobile device.

Embodiments of the present invention belong to the class of network based software solutions (NBSS). In particular, embodiments of the present invention described in this section are based on the use of signal level measurements and focus on applications where coverage prediction maps are not available. However, embodiments of the present invention can be used where coverage prediction maps are available. Coverage prediction maps are used in some methods where the mobile device location is estimated as the location on a coverage map where the values of predicted signal strengths best match the levels actually measured.

The measurement/information needed to implement the algorithms described hereinafter can be separated into network configuration parameters such as: base station coordinates; sector orientation and base transceiver antenna radiation patterns in the case of sectorised cells; and maximum base transceiver station downlink transmission power, and measurements such as the level of signals received by the mobile device. In addition to that data, knowledge of suitable models to link level measurements to the reciprocal position of the mobile devices to be located and the base transceiver stations used in the positioning procedure are required. These will be discussed in more detail below.

The location methods outlined hereinafter estimate the mobile device coordinates at the location where a certain function has its minimum value. The function is obtained by combining level observations which are estimates of the attenuation experienced by the signals received by the mobile device and transmitted by the base transceiver stations involved. Level observations are estimated by subtracting from the levels received by the mobile device, the contribution of the base transceiver stations antenna radiation patterns (which is dependent on the reciprocal angular position between the mobile device and the base transceiver stations), the path loss (which is dependent on the distance between the mobile device and the respective base transceiver station) and other constant factors such as the base transceiver stations transmission power, cable losses, antenna losses etc.

Clearly, the accuracy of the results provided by the algorithm depends on the accuracy of the information available. The accuracy of the result can be improved by including accurate definitions of the antenna radiation patterns and finely tuned propagation models. These models, in principle, do not need to be expressed in an analytical form but may be included in the location algorithms as look-up tables from which, given a certain mobile device to base transceiver station angle of arrival, the antenna gains can be retrieved. However, this further refinement Can be omitted from embodiments of the present invention.

It is preferred that the network information such as base transceiver station coordinates, sector information, antenna radiation patterns and other adjustable parameters should be constantly updated.

In preferred embodiments of the present invention, the models used to represent signal level measurements may be continuously adaptive to changes in the radio environment, preferably in an automatic way. One way to accomplish this is to adjust the models based on statistical comparisons between a certain set of collected measurements and the corresponding true quantities. This however requires the exact position of the mobile device to be known in order to calculate the true quantities and to compare them with the measurements. When the measurement models are derived offline, drive tests can be performed collecting at the same time level measurements and mobile device location information by means of a GPS (Global Positioning System) receiver co-located with the mobile device. There may be other techniques which are implemented which provide a more accurate location technique, for example, those using an estimated observe time difference or arrival technique or an assisted GPS location estimate, that allow the determination of the measurement models on-line.

The algorithms which are described hereinafter are applications of the maximum likelihood principle to estimate the mobile device coordinates by processing a set of observations from the level measurements. Different maximum likelihood approaches are set out.

The location algorithms use signal level measurements to estimate the mobile device coordinates, x and y, along with the variants of the slow fading $\sigma_u^2$ assumed to be equal for all the base stations involved.

As explained above in embodiments of the present invention described in this section the input data required by the algorithms includes signal strength measurements collected by the mobile device (MS), network parameters, and a suitable path-loss law—in other words a suitable model for the wireless transmission characteristics. The list of input data follows.

Average power of the signals received by the MS from N base transceiver stations (BTS's) measured in decibels, $$P_r^i \quad (1)$$

Coordinates of the N measured BTS's in meters, $(x^i, y^i)$:

$$(x^i, y^i)(i=1,\ldots,N); [x^i]=[y^i]=m \quad (2)$$

Orientation of the sectors of the N base transceiver stations (BTS's) (in the case of sectorized cells) in radians measured counter-clockwise from the x direction, $\phi_B^i$:

$$\phi_B^i(i=1,\ldots,N) \; [\phi_B^i]=\text{rad} \quad (3)$$

Maximum radiated power from N measured BTS's in decibels:

$$P_{t,max}^i = P_t^i + G_{t,max}^i + G_{r,max} - \text{Losses}^i; \; [P_{t,max}^i]=\text{dB} \quad (4)$$

The maximum radiated power, $P_{t,max}^i$, represents the maximum power at the output of the i-th BTS antenna in the direction of maximum gain. It includes the transmitted power, $P_t^i$, the maximum gain of the BTS transmit antenna, $G_{t,max}^i$, antennas losses, cable losses, etc.; all measured in dB. To simplify the mathematical model, $P_{t,max}^i$ includes also the maximum gain of the MS receive antenna, $G_{t,max}$.

Combined Transmit-Receive antenna pattern for the i-th BTS (i=1,...,N) in decibels:

$$AP_{tr}^i(\psi^i(x,y))=AP_t^i(\psi^i(x,y)-\phi_B^i)+AP_r(\psi^i(x,y)-\phi_M); \; [AP_{tr}^i]=\text{dB} \quad (5)$$

The combined radiation pattern, $AP_{tr}^i(\psi^i(x,y))$, represents the gain introduced by the antenna installed at the BTS site and the antenna installed in the handset. The gain depends on the reciprocal orientation of such antennas. In the embodiment represented by the above equation, $\phi_M$ is the orientation of the antenna installed at the MS, $\phi_B^i$ is the orientation of the antenna installed at the i-th BTS and $\psi^i(x,y)$ is the angle of arrival of the signal transmitted by the i-th BTS and received by the mobile device (MS), measured in radians counter-clockwise from the x direction (see FIG. 3):

$$\psi^i(x,y) = \tan^{-1}\frac{y^i - y}{x^i - x}; [\psi^i] = \text{rad} \quad (6)$$

The combined radiation pattern $AP_{tr}^i$, is a function of the MS coordinates (x,y). It includes the radiation pattern of the transmit antenna installed at the i-th BTS, $AP_t^i(\theta)$, and the radiation pattern of the antenna installed at the mobile device (MS), $AP_r(\theta)$. In embodiments of the invention the antenna at the MS is omni-directional and the orientation of such antenna is unknown; thus $AP_r(\theta)=0$ dB and $\phi_M=0$ rad.

The path-loss law for the propagation between MS and the i-th BTS measured in decibels:

$$PL^i(d^i(x,y)); [PL^i]=\text{dB} \quad (7)$$

The path-loss $PL^i(d^i(x,y))$ represents the attenuation experienced by the signal transmitted by the i-th BTS as it propagates further away from the transmit antenna. It is expressed as a function of the distance between the MS and the i-th BTS, $d^i$, which in turn depends on the MS coordinates:

$$d^i(x,y)=\sqrt{(x^i-x)^2+(y^i-y)^2} \quad (8)$$

The output of the location algorithms comprises:

An Estimate of the MS location in meters:

$$\hat{x},\hat{y} \quad (9)$$

An Estimate of the variance of the log-normal slow fading in decibels:

$$\hat{\sigma}_u^2 \quad (10)$$

As mentioned previously, the algorithms apply maximum likelihood estimation principles. They estimate the mobile device (MS) location and variation of the slow fading by minimising certain scalar functions. The functions are obtained by combining level observations which are measurements of the attenuation experienced by the signal received by the mobile device (MS) with the corresponding expected quantities, determined as a combination of the base transceiver stations antenna radiation patterns (which are dependent on the reciprocal angular position between the mobile station and respective base transceiver stations) and path loss (which is dependent on the distance between the mobile station and the base transceiver stations). By minimising a certain cost function, (a cost function is a generally applied term in mathematics for the description of optimization problems), the algorithms find the value of the unknown parameters which globally minimise the difference between the observed attenuation and the expected attenuation. The cost function is a measure of the expected errors in the estimation of the location of the mobile device (MS). Therefore by minimising the cost function the expected location error is also minimised. Embodiments of the invention use the following algorithms depending upon assumed characteristics of the wireless environment.

Embodiments of the present invention perform the first algorithm A where the wireless environment is assumed to comprise correlated slow fading characteristics and where the slow fading is assumed to have equal variance statistics. In other words the signal transmitted by each base transceiver station (BTS) to the mobile device (MS) has a similar but not identical characteristics. This type of assumption is accurate where the transmission paths between base transceiver stations (BTS) and mobile device are similar.

Algorithm A: Maximum Likelihood Estimation with Level Observations Assuming Correlated Slow Fading and Equal Variance 1. Calculate the i-th level observation, $L^i$, by subtracting from the i-th measured received power, $P_r^i$, the maximum power radiated by the i-th BTS, $P_{t,max}^i$:

$$L^i = P_r^i - P_{t,max}^i; i=1,\ldots,N \qquad (11)$$

$L^i$ is the total attenuation experienced by the signal transmitted by the i-th BTS while propagating toward the MS. The total attenuation depends on path-loss, gains introduced by BTS antenna and MS antenna, fluctuations of the radio channel, etc.

2. Stack the level observations from N BTS's in vector L:

$$L = [L^1, \ldots, L^N]^T \qquad (12)$$

3. Solve the minimization problem:

$$\begin{bmatrix} \hat{\sigma}_u^2 \\ \hat{x} \\ \hat{y} \end{bmatrix} = \arg \min_{\begin{bmatrix} \sigma_u^2 \\ x \\ y \end{bmatrix}} F(x, y; \sigma_u^2) \qquad (13)$$

where the cost function $F(x,y; \sigma_u^2)$ is defined as follows:

$$F(x, y; \sigma_u^2) = \qquad (14)$$
$$\ln \sigma_u^2 + \ln|r_L(x, y)| + \frac{1}{\sigma_u^2}(L - m_L(x, y))^T r_L^{-1}(x, y)(L - m_L(x, y))$$

and $$m_L(x, y) = [\mu_L^1(x, y), \ldots, \mu_L^N(x, y)]^T \qquad (15)$$

$$\mu_L^i(x, y) = -PL^i(d^i(x, y)) - AP_{tr}^i(\psi^i(x, y)) \qquad (16)$$

$$[r_L(x, y)]_{ij} = \begin{cases} 1 & i = j \\ \rho_u^{i,j}(x, y) & i \neq j \end{cases} \quad i, j = 1, \ldots, N \qquad (17)$$

$\rho_u^{i,j}(x,y)$ is the cross-correlation of the slow fading affecting the signals propagating from $BTS^i$ and $BTS^j$ toward the MS.

Embodiments of the present invention perform the second algorithm B where the wireless environment is assumed to comprise uncorrelated slow fading characteristics and where the slow fading is assumed to have equal variance statistics. In other words the signal transmitted by each base transceiver station (BTS) to the mobile device (MS) has unrelated characteristics. This type of assumption is accurate where the transmission paths between base transceiver stations (BTS) and mobile device (MS) have no similar components.

Algorithm B: Maximum Likelihood Estimation with Level Observations Assuming Uncorrelated Slow Fading and Equal Variance 1. Calculate the i-th level observation by subtracting from the i-th measured received power, $P_r^i$, the maximum power radiated by the i-th BTS, $P_{t,max}^i$:

$$L^i = P_r^i - P_{t,max}^i; i=1,\ldots,N \qquad (18)$$

2. Stack level observations from N BTS's in vector L:

$$L = [L^1, \ldots, L^N]^T \qquad (19)$$

3. Solve the minimization problem:

$$\begin{bmatrix} \hat{x} \\ \hat{y} \end{bmatrix} = \arg \min_{\begin{bmatrix} x \\ y \end{bmatrix} \in D_{xy}} F(x, y) \qquad (20)$$

where the cost function $F(x,y)$ is defined as follows:

$$F(x, y) = \sum_{i=1}^{N} (L^i + PL^i(x, y) + AP_{tr}^i(x, y))^2 \qquad (21)$$

and $D_{xy}$ is the domain of existence of x and y. Several possible definitions for $D_{xy}$ are given later in the present application.

4. Calculate $\hat{\sigma}_u^2$ as $$\hat{\sigma}_u^2 = F(\hat{x}, \hat{y}) \qquad (22)$$

Algorithm B differs from Algorithm A in the definition of the cost function. At the basis of this different definition is a different model for the slow fading affecting the signals transmitted by two BTS's. In Algorithm A the fading is assumed correlated while in Algorithm B is assumed uncorrelated; this results in a simpler definition of the cost function of Algorithm B.

Embodiments of the present invention perform the third algorithm C where the wireless environment is assumed to comprise uncorrelated slow fading characteristics and where the slow fading is assumed to have equal variance statistics. In other words the signal transmitted by each base transceiver station (BTS) to the mobile device (MS) has unrelated characteristics. This type of assumption is accurate where the transmission paths between base transceiver stations (BTS) and mobile device (MS) have no similar components.

Algorithm C: Maximum Likelihood Estimation with Level Difference Observations Assuming Uncorrelated Slow Fading and Equal Variance.

1. Calculate the i-th level observation by subtracting from the i-th measured received power, Pt, the maximum power radiated by the i-th BTS, $P_{t,max}^i$:

$$L^i = P_r^i - P_{t,max}^i; i=1,\ldots,N \qquad (23)$$

2. Calculate the j-th level difference observation by subtracting the j-th level observation from the level observation $L^1$ taken as reference:

$$D^j = L^1 - L^j; j=2,\ldots,N \qquad (24)$$

3. Stack the N−1 difference of level observations in a vector D:

$$D = [D^2, \ldots, D^N]^T \qquad (25)$$

4. Solve the minimization problem $$\begin{bmatrix} \hat{x} \\ \hat{y} \end{bmatrix} = \arg \min_{\begin{bmatrix} x \\ y \end{bmatrix} \in D_{xy}} F(x, y) \text{ where} \qquad (26)$$

$$F(x, y) = \sum_{j=2}^{N} (D^j - \mu_D^j(x, y))^2 - \frac{1}{N}\left(\sum_{j=2}^{N} D^j - \mu_D^j(x, y)\right)^2 \text{ and} \qquad (27)$$

$$\mu_D^j(x, y) = \qquad (28)$$
$$-[PL^1(d^1(x, y)) - PL^j(d^j(x, y))] - [AP_{tr}^1(\psi^1(x, y)) - AP_{tr}^j(\psi^j(x, y))]$$

$D_{xy}$ is the domain of existence of x and y. Several possible definitions for selecting $D_{xy}$ are given later.

5. Calculate $\hat{\sigma}_u^2$ as $$\hat{\sigma}_u^2 = F(\hat{x}, \hat{y}) \qquad (29)$$

Algorithm C differs from Algorithms A and B in the definition of the observations and, as a consequence, in the definition of the cost function. The observations considered in Algorithm C are differences in the attenuation experienced by signals transmitted by two different BTS's and received by the MS. To simplify Algorithm C, moreover, the slow fading processes affecting signals transmitted by two BTS's are assumed uncorrelated, analogously as in Algorithm B.

Algorithms A, B and C described hereinbefore are non-linear algorithms. The above location algorithms are hereafter further detailed and described.

Figure 3:
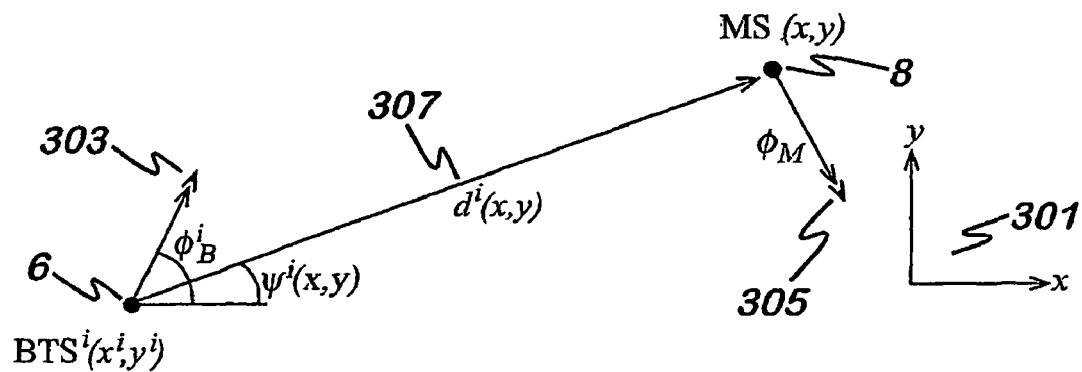
FIG. 3 shows a geometric representation of a base transceiver station and mobile device in a wireless cellular network as shown in FIG. 1.

FIG. 3 shows the basic geometry of the problem. FIG. 3 comprises a mobile device (MS) 8, and the i-th base transceiver station (BTS) 6. The MS 8 and BTS 6 exist in a region defined by a Cartesian co-ordinate system 301. All angles are defined as being defined from the x-axis in an anti-clockwise direction. The i-th BTS 6 is located at the point defined as $(x^i, y^i)$ and arranged to broadcast and receive with a maximum gain direction 303 on an angle defined as $\phi_B^i$. The mobile device MS 8 is located at the point (x,y) and is arranged also to transmit and receive with a maximum gain direction 305 on an angle $\phi_M$. The MS 8 is positioned in relation to the i-th BTS 6 by a line 307 comprising length $d^i(x,y)$ and by an angle $\psi^i(x,y)$. In further embodiments of the invention alternative co-ordinate systems to the Cartesian system are used. In other embodiments of the invention the polar reference system centred on $BTS^i$ with the distance between MS and $BTS^i$, $d^i$, defined as the radial coordinate and the Angle Of Arrival of the signal received by the mobile device, $\psi^i$, defined as the angular coordinate:

The distance between the mobile device (MS) and the i-th base transceiver station (BTS) is defined according to equation (30):

$$d^i(x,y) = \sqrt{(x^i-x)^2+(y^i-y)^2} \tag{30}$$

Angle of arrival of the signal transmitted by the i-th BTS and received by the mobile device (MS) is defined according to equation (31):

$$\psi^i(x,y) = \tan^{-1}\frac{y^i-y}{x^i-x} \tag{31}$$

The transformation between x,y (Cartesian) and $d^i$, $\psi^i$ (radial) coordinates is completed by the following formulas:

$$\begin{cases} x = x^i + d^i\cos\psi^i \\ y = y^i + d^i\sin\psi^i \end{cases} \tag{32}$$

The location algorithms as described in the above embodiments estimate the MS location by processing certain level observations. Such observations are obtained from signal strength measurements performed by the MS. This section derives a model for level observations from a model of signal strength measurements performed by the MS. Such measurements are, by definition, estimates of the average power of the received signals. A general model to calculate the average power received by the mobile at a particular location, (x,y), from the i-th base station is the following (all quantities are in dB):

$$P_r^i(x,y) = P_t^i + G_r^i(x,y) + G_t^i(x,y) - PL^i(x,y) - \text{Losses}^i + u^i(x,y) \text{ dB} \tag{33}$$

Where
$P_r^i(x,y)$ is the power of the signal received by the MS at location (x,y);

$P_t^i$ is the BTS transmitting power;

$G_r^i(x,y)$ is the MS antenna gain in the direction of the i-th BTS;

$G_t^i(x,y)$ is the antenna gain of the i-th BTS in the direction of the MS;

$PL^i(x,y)$ is the path-loss determined by the propagation path between MS and BTS;

the term "$\text{Losses}^i$" takes into account the losses due to antenna feeder, cables, duplex, divider, etc.

$u^i(x,y)$ is the shadow fading affecting the signal transmitted by the i-th BTS. It is generally modelled as a random variable with log-normal distribution (i.e, $u^i(x,y)$ measured in dB is a Gaussian random variable) with standard deviation $\sigma_u^i$. Typical values for $\sigma_u^i$ range from 5 to 10 decibels:

$$u^i(x,y) \sim N(0,\sigma_u^i) \; [u^i] = \text{dB} \tag{34}$$

Equation (33) is the starting point to study techniques for locating mobiles by means of observations derived from observed level (or received level RXLEV) measurements. It is a general enough model to allow introduction of several parameters affecting the propagation such as antenna radiation patterns, path loss and random fluctuations.

Antenna gains are usually expressed analytically as a function of an angle, θ, which describes the angular distribution of the power radiated by the antenna when it is connected to a transmitter. In case of directional antennas, the direction of maximum gain is identified by the direction θ=0:

$$G(\theta=0) = G_{max} \tag{35}$$

The antenna gain G(θ) can be separated in the sum of a constant term defining the maximum antenna gain, $G_{max}$, and the radiation pattern, AP(θ), which describes the angular distribution of the radiated power:

$$G(\theta) = G_{max} - AP(\theta); \; AP(\theta) \geq 0 \text{ dB}; \; AP(\theta=0) = 0 \text{ dB} \tag{35}$$

Figure 4:
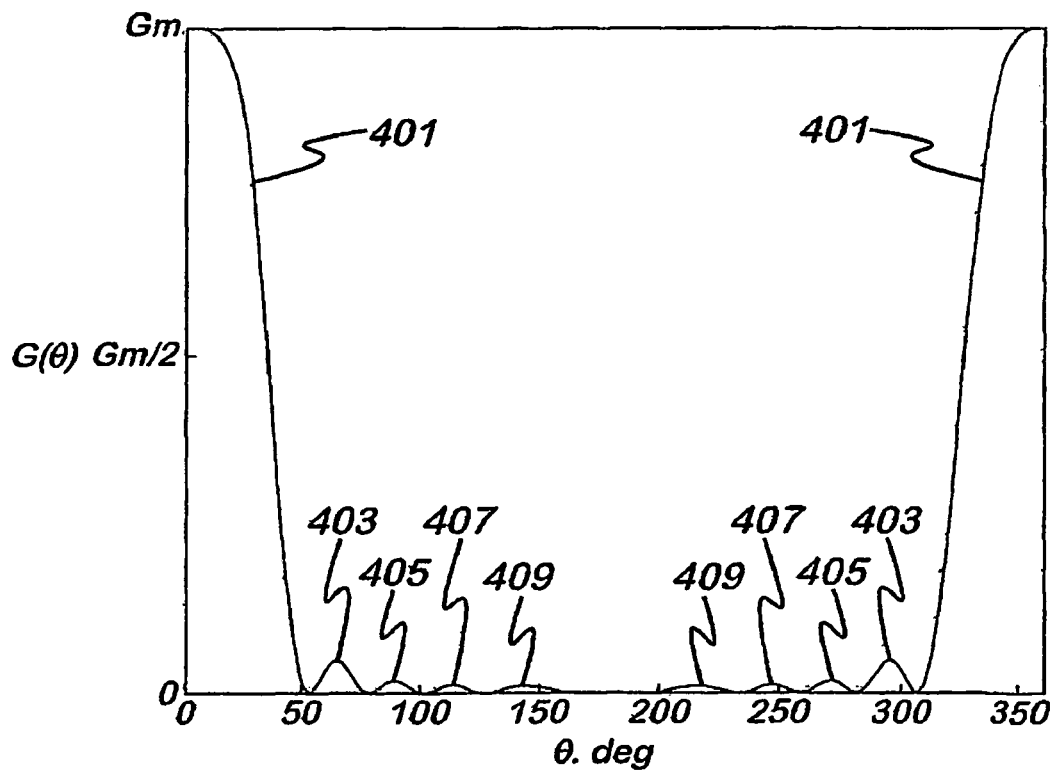
FIG. 4 shows an example of antenna gain in a transceiver as shown in FIG. 1.

FIG. 4 shows a graph of an antenna gain for an antenna as used in an embodiment of the invention. The graph of FIG. 4 comprises the y-axis representing antenna gain G(θ) and the x-axis representing the orientation from the angle of maximum gain. The antenna gain is symmetrical about the θ=0 line. The antenna gain graph comprises a main lobe (or beam) 401 and four side lobes (or beams) 403, 405, 407, 409 either side of the main lobe. The main lobe 401 comprises a maximum gain $G_m$ centred at θ=0, The main lobe antenna gain decreases rapidly to zero either side of θ=0. The side lobes 403, 405, 407, 409 comprise smaller maximum gains, and arranged so that the first side lobe 403 (the side lobe directly adjacent to the main lobe 401) has a larger maximum gain than the second side lobe 405 (the side lobe adjacent to the first side lobe 403 and the third side lobe 407). The second lobe 405, in turn, has a larger maximum gain than the third lobe 407 (the side lobe adjacent to the second side lobe 405 and the fourth side lobe 409), and the third side lobe 407 has a larger maximum gain than the fourth side lobe 409 (the side lobe adjacent to the third side lobe 407).

When analytic expressions of the antennas radiation patterns are not available an approximation is needed.

The orientation of the BTS antenna, $\phi_B^i$ (as shown in FIG. 3) specifies the direction toward which the maximum power is radiated. This means that, given the (x,y) MS coordinates, $\psi^i(x,y)$ (e.g., the angle in which BTS' "sees" the MS) can be calculated and the downlink transmission gain toward the MS can be expressed as follows:

$$G_t^i(x,y) = G_t^i(\psi^i(x,y)-\phi_B^i) = G_{t,max}^i - AP_t^i(\psi^i(x,y)-\phi_B^i) \tag{36}$$

In principle, if the MS is equipped with a directional antenna and the orientation of the antenna is known, an analogous formula can be used to describe the gain of the receive antenna at the MS side:

$$G_r^i(x,y) = G_r^i(\psi^i(x,y)-\phi_M) = G_{r,max} - AP_r(\psi^i(x,y)-\phi_M) \quad (37)$$

Although mobile devices can be equipped with directional antennas, it is not realistic to assume that the orientation of the MS antenna is known; thus in other embodiments of the present invention the MS antenna radiation pattern can be modelled with an averaged omni-directional pattern by imposing the following constraints $$G_{r,max} = G_{r,avg}; \quad AP_r(\theta) = 0 \text{ dB} \quad (38)$$

The substitution of (36) and (37) in (33) results in the following compact expression for the received power:

$$P_r^i(x,y) = P_{t,max}^i - AP_{tr}^i(\psi^i(x,y)) - PL^i(x,y) + u^i(x,y) \quad (39)$$

where the auxiliary definitions $P_{t,max}^i$ and $AP_{tr}^i$ have been defined previously in equations (4) and (5) respectively.

Several analytical expressions for the path-loss $PL^i$ in equation (33) have been proposed in the scientific literature. In fact, this term is at the basis of the propagation loss prediction models based on which cellular operators design their networks. In order to calculate precisely the attenuation experienced by a signal travelling from a base station to a mobile, finely tuned prediction models including also information on topography and morphology of the environment should be considered. However, when terrain maps are not available, simplified models must be used. Such available propagation models are known in the art and in embodiments of the present invention the propagation model the path loss as a function of the MS-to-BTS distance only with no dependence from the angle of arrival (AOA):

$$PL^i(x,y) = PL^i(d^i(x,y)) \quad (40)$$

With the above considerations in mind, the average power received by the mobile device (MS) at a particular location, (x,y), from the i-th base station $P_r^i$ can be expressed as follows:

$$P_r^i(d^i(x,y), \psi^i(x,y)) = P_{t,max}^i - AP_{tr}^i(\psi^i(x,y)) - PL^i(d^i(x,y)) + u^i(x,y) \quad (41)$$

where previous definitions for; the maximum radiated power from the i-th base transceiver station $P_{t,max}^i$ [equation (4)], the combined transmit-receive antenna pattern $AP_{tr}^i$ [equation (5)], the path loss between the mobile device (MS) and the i-th base transceiver station (BTS) $PL^i$ [equation (7)] and the log-normal shadow fading affecting the signal transmitted by the i-th BTS $u^i$ [equation (34)] hold (all quantities are in dB):

Moving from the model as described by equation (41), the hereafter derive and characterize statistically the observations that can be derived from level measurements in a mobile radio network and used for MS location purposes as used in embodiments of the present invention.

One measurement, or observation, as used in the embodiments of the invention for location purposes in algorithms A, B and C, is the difference between the average power received by the mobile, $P_r^i$, and the maximum power radiated by the i-th BTS, $P_{t,max}^i$:

$$L^i = P_r^i - P_{t,max}^i \quad (42)$$

This definition is justified by the fact that the MS location-dependent information is embedded in the difference $P_r^i - P_{t,max}^i$ and that the maximum radiated power $P_{t,max}^i$ is a parameter reasonably easy to calculate, given the network configuration.

According to the propagation model (41), $L^i(d^i(x,y), \psi^i(x,y))$ is a random variable, due to the stochastic nature of $u^i(x,y)$. Since $u^i(x,y)$ is a Gaussian random variable, $L^i(d^i(x,y), \psi^i(x,y))$ is a Gaussian random variable as well:

$$L^i(x,y) \sim N(\mu_L^i(x,y), \sigma_L^i(x,y)) \quad (43)$$

The mean value $\mu_L^i(x,y)$ and standard deviation $\sigma_L^i(x,y)$ can be derived as follows:

Mean Value of $L^i(x,y)$ $$\mu_L^i(x, y) = E[L^i(x, y)] = -PL^i(d^i(x, y)) - AP_{tr}^i(\psi^i(x, y)) \quad (44)$$

Variance of $L^i(x,y)$ $$(\sigma_L^i(x,y))^2 = E[(L^i(x,y))^2] - (\mu_L^i(x,y))^2 = E[(u^i(x,y))^2] = (\sigma_u^i)^2 \quad (45)$$

The mean value and standard deviations of the i-th observation depends on the MS coordinates (x,y). The probability density function (pdf) of $L^i$ conditioned by x and y can be then expressed as $$f_{L^i|x,y}(L^i \mid x, y) = \frac{1}{\sqrt{2\pi}\,\sigma_L^i \cdot (x, y)} \exp\left\{-\frac{(L^i - \mu_L^i(x, y))^2}{2(\sigma_L^i \cdot (x, y))^2}\right\} \quad (46)$$

In embodiments of the present invention for MS location estimation purposes, level observations from different BTS's are used. For this reason, the covariance of two level observations is of interest. The covariance of two level observation in turn depends on the cross-correlation of the slow fading processes affecting the propagation of a signal from different BTS's. Often the slow fading processes are considered uncorrelated. However, as is known a certain correlation exists between signals sent from different BTS's. Therefore in embodiments of the present invention use a model for the cross-correlation of the slow fading, defined as follows:

$$\frac{E[u^i(x, y)u^j(x, y)]}{\sigma_u^i \sigma_u^j} = \rho_u^{i,j}(x, y) \quad (47)$$

The Covariance of $L^i(x,y)$ and $L^j(x,y)$ can therefore be shown as the following (x and y are neglected for notational convenience).

$$E[(L^i - \mu_L^i)(L^j - \mu_L^j)] = E[(L^i L^j)] - \mu_L^i \mu_L^j = \sigma_u^i \sigma_u^j \rho_u^{i,j} \quad (48)$$

Level measurements from multiple BTS's, $BTS^1, \ldots, BTS^N$ can be collected and used in further embodiments of the invention to estimate the MS location. Single level observations as shown in equation (42) can be stacked in a N×1 vector of observations, L:

$$L = [L^1, \ldots, L^N]^T \quad (49)$$

which has a multivariate Gaussian distribution:

$$L \sim N(m_L(x,y), R_L(x,y)) \quad (50)$$

The mean value and covariance matrix of L can in embodiments of the present invention be readily calculated by the use of the results from the previous equations:

The mean value of L(x,y) can be written as:

$$m_L(x, y) = [\mu_L^1(x, y), \ldots, \mu_L^N(x, y)]^T \quad (51)$$

The covariance matrix of L(x,y) can be written as:

$$R_L(x,y) = E\{LL^T\} - m_L m_L^T \quad (52)$$

The generic element of $R_L(x,y)$ being (see equation (48))

$$[R_L(x, y)]_{ij} = \begin{cases} (\sigma_u^i)^2 & i = j \\ \sigma_u^i \sigma_u^j \rho_u^{i,j}(x, y) & i \neq j \end{cases} \quad (53)$$

The probability density function of L conditioned by x and y can therefore be written as equation (54) (where $|R_L(x,y)|$ indicates the determinant of the covariance matrix $R_L(x,y)$)

$$f_{L|x,y}(L \mid x, y) = \frac{1}{(2\pi)^{N/2} |R_L(x, y)|^{1/2}} \quad (54)$$
$$\exp\left\{-\frac{1}{2}[L - m_L(x, y)]^T R_L^{-1}(x, y)[L - m_L(x, y)]\right\}$$

In further embodiments of the invention, one simplifying assumption can be made by considering the slow fading from different BTS's as having the same variance:

$$\sigma_u^i = \sigma_u^j \triangleq \sigma_u \quad (55)$$

This assumption is accurate where the propagation takes place in a homogeneous communications environment. In other words where the communications environment is consistent and similar. Thus the slow fading affecting different BTS's have statistically the same properties. The assumption of the same covariance for all slow fading links results in a modified structure of the covariance matrix $R_L(x,y)$. The structure of the covariance matrix becomes the product between the slow fading variance (which is common to all BTS's), $\sigma_u^2$, and the matrix, $r_L(x,y)$, which depends only on the location-dependent cross correlations, $\rho_u^{i,j}(x,y)$:

$$\sigma_u^i = \sigma_u^j \Rightarrow \sigma_u \Rightarrow R_L(x,y) = \sigma_u^2 r_L(x,y) \quad (56)$$

$$[r_L(x, y)]_{ij} = \begin{cases} 1 & i = j \\ \rho_u^{i,j}(x, y) & i \neq j \end{cases} \quad (57)$$

Using the assumption defined above, the probability density function of L conditioned by x and y in equation (54) can be written as:

$$f_{L|x,y}(L \mid x, y) = \frac{1}{(2\pi)^{N/2} \sigma_u |r_L(x, y)|^{1/2}} \exp \quad (58)$$
$$\left\{-\frac{1}{2\sigma_u^2}[L - m_L(x, y)]^T r_L^{-1}(x, y)[L - m_L(x, y)]\right\}$$

In further embodiments, the slow fading processes are assumed not only to have equal variances but to also be uncorrelated. In such an embodiment $r_L(x,y)$ becomes an N×N identity matrix, independent of the MS coordinates:

$$r_L(x,y) = r_L = I \quad (59)$$

and the probability density function (58) changes in $$f_{L|x,y}(L \mid x, y) = \frac{1}{(2\pi)^{N/2} \sigma_u} \exp\left\{-\frac{1}{2\sigma_u^2}\|L - m_L(x, y)\|^2\right\} \quad (60)$$

where (see equations (51) and (44))

$$\|L - m_L(x, y)\|^2 = [L - m_L(x, y)]^T [L - m_L(x, y)] \quad (61)$$
$$= \sum_{i=1}^{N} (L^i + PL^i(x, y) + AP_{tr}^i(x, y))^2$$

A Model for the Level Difference Observation

The i-th level observation L defined in equation (42) is obtained from the level measured by the MS on the signal transmitted by the i-th BTS. In a further embodiment of the present invention observations can also be derived from the difference between the level measured by the mobile device from one BTS taken as reference and the level measured by the mobile device from another BTS.

Using difference in levels help in eliminating unknown common biases in the absolute level measurements. Following an approach similar to those discussed above, the following shows the statistical characterization of the level difference observation.

The difference in level observation is defined in a further embodiment of the present invention as the difference between the level observation from the i-th BTS and the level observation from a reference BTS (in the following identified by the index i=1) as defined in (42):

$$D^i = L^1 - L^i; i = 2, \ldots, N \quad (62)$$

$D^i$ is a Gaussian variable, due to the stochastic nature of the log-normal fading:

$$D^i(x,y) \sim N(\mu_D^i(x,y), \sigma_D^i(x,y)) \quad (63)$$

The mean value and covariance of $D^i(x,y)$ can be derived as follows:

The mean value of $D^i(x,y)$ $$\mu_D^i(x, y) = E[D^i(x, y)] = E[L^1(x, y) - L^i(x, y)] \quad (64)$$
$$= (\mu_L^1(x, y) - \mu_L^i(x, y))$$
$$= -[PL^1(d^1(x, y)) - PL^i(d^i(x, y))] -$$
$$[AP_{tr}^1(\psi^1(x, y)) - AP_{tr}^i(\psi^i(x, y))]$$

The covariance of $D^i(x,y)$ and $D^j(x,y)$

The covariance between a pair of level difference observations is needed in embodiments of the present invention because the location algorithms use joint multiple level difference observations. The general definition of covariance between $D^i(x,y)$ and $D^j(x,y)$ is (x and y are neglected to simplify the notation):

$$E[(D^i - \mu_D^i)(D^j - \mu_D^j)] = \begin{cases} (\sigma_D^i)^2; & i = j \\ E[D^i D^j] - \mu_D^i \mu_D^j; & i \neq j \end{cases} \quad (65)$$

The term resulting when i=j is the variance of the i-th difference observation, $(\sigma_D^i)^2$:

$$(\sigma_D^j)^2 = E[(D^i)^2] - (\mu_D^i)^2 \qquad (66)$$
$$= E[(L^1)^2] + E[(L^i)^2] - 2E[L^1 L^i] - (\mu_D^i)^2$$
$$= (\mu_L^1)^2 + (\sigma_L^1)^2 + (\mu_L^i)^2 + (\sigma_L^i)^2 - 2\sigma_u^1 \sigma_u^i \rho_u^{1,i} -$$
$$2\mu_L^1 \mu_L^i - (\mu_L^1 - \mu_L^i)^2$$
$$= (\sigma_u^1 - \sigma_u^i)^2 + 2\sigma_u^1 \sigma_u^i (1 - \rho_u^{1,i})$$

where $\rho_u^{1,i}$ is the cross-correlation between the slow fading affecting the propagation from $BTS^1$ and $BTS^i$ defined in equation (47).

The term for i≠j can be calculated as follows:

$$E[D^i D^j] - \mu_D^i \mu_D^j = E[(L^1 - L^i)(L^1 - L^j)] - \qquad (67)$$
$$(\mu_L^1 - \mu_L^i)(\mu_L^1 - \mu_L^j)$$
$$= E[(L^1)^2] - E[L^1 L^i] -$$
$$E[L^1 L^j] + E[L^i L^j] + -$$
$$(\mu_L^1 - \mu_L^i) \cdot (\mu_L^1 - \mu_L^j)$$
$$= (\mu_L^1)^2 + (\sigma_L^1)^2 - (\sigma_u^1 \sigma_u^i \rho_u^{1,i} + \mu_L^1 \mu_L^i) -$$
$$(\sigma_u^1 \sigma_u^j \rho_u^{1,j} + \mu_L^1 \mu_L^j) + (\sigma_u^i \sigma_u^j \rho_u^{i,j} + \mu_L^i \mu_L^j) -$$
$$(\mu_L^1 - \mu_L^i) \cdot (\mu_L^1 - \mu_L^j)$$
$$= \sigma_u^1 (\sigma_u^1 - \sigma_u^i \rho_u^{1,i} - \sigma_u^j \rho_u^{1,j}) +$$
$$\sigma_u^i \sigma_u^j \rho_u^{i,j}$$

Thus in embodiments of the present invention the covariance between two level difference observations is summarized as:

$$E[(D^i - \mu_D^i)(D^j - \mu_D^j)] = \qquad (68)$$
$$\begin{cases} (\sigma_u^1 - \sigma_u^i)^2 + 2\sigma_u^1 \sigma_u^i (1 - \rho_u^{1,i}); & i = j \\ \sigma_u^1 (\sigma_u^1 - \sigma_u^i \rho_u^{1,i} - \sigma_u^j \rho_u^{1,j}) + \sigma_u^i \sigma_u^j \rho_u^{i,j}; & i \neq j \end{cases}$$

The probability density function of $D^i$ conditioned by x and y can be expressed as follows:

$$f_{D^i|x,y}(D^i \mid x, y) = \frac{1}{\sqrt{2\pi}\,\sigma_D^i(x,y)} \exp\left\{-\frac{(D^i - \mu_D^i(x,y))^2}{2(\sigma_D^i(x,y))^2}\right\} \qquad (69)$$

Measurements from multiple BTS's, $BTS^1, \ldots, BTS^N$ can be collected and used to estimate the MS location. In further embodiments of the present invention Level difference observations can be stacked in a (N−1)×1 vector of observations, D:

$$D = [D^2, \ldots, D^N]^T \qquad (70)$$

which has a multivariate Gaussian distribution:

$$D \sim N(m_D(x,y), R_D(x,y)) \qquad (71)$$

Mean value and covariance matrix of D can be readily calculated from the results defined above:

The mean value of D(x,y)

$$m_D(x,y) = [\mu_D^2(x,y), \ldots, \mu_D^N(x,y)]^T =$$
$$[\mu_L^1(x,y) - \mu_L^2(x,y), \ldots, \mu_L^1(x,y) - \mu_L^N(x,y)]^T \qquad (72)$$

The covariance matrix of D(x,y)

$$R_D(x,y) = E\{DD^T\} - m_D m_D^T \qquad (73)$$

The generic element of $R_D(X,Y)$ being (see equation (68)):

$$[R_D(x,y)]_{ij} = E[(D^i - \mu_D^i)(D^j - \mu_D^j)] \qquad (74)$$
$$= \begin{cases} (\sigma_u^1 - \sigma_u^i)^2 + 2\sigma_u^1 \sigma_u^i (1 - \rho_u^{1,i}); & i = j \\ \sigma_u^1 (\sigma_u^1 - \sigma_u^i \rho_u^{1,i} - \sigma_u^j \rho_u^{1,j}) + \sigma_u^i \sigma_u^j \rho_u^{i,j}; & i \neq j \end{cases}$$

The following probability density function of D conditioned by x and y results $$f_{D|x,y}(D \mid x,y) = \frac{1}{(2\pi)^{N/2}|R_D(x,y)|^{1/2}} \exp \qquad (75)$$
$$\left\{-\frac{1}{2}[D - m_D(x,y)]^T R_D^{-1}(x,y)[D - m_D(x,y)]\right\}$$

In further embodiments of the present invention the slow fading from different BTS's are assumed to have the same variance:

$$\sigma_u^i = \sigma_u^j \triangleq \sigma_u; \; i,j = 2, \ldots, N \qquad (76)$$

The elements of the covariance matrix $R_D(X,y)$ become:

$$[R_D(x,y)]_{ij} = \begin{cases} 2\sigma_u^2(1 - \rho_u^{1,i}); & i = j \\ \sigma_u^2(1 - \rho_u^{1,i} - \rho_u^{1,j} + \rho_u^{i,j}); & i \neq j \end{cases} \qquad (77)$$

Moreover, in further embodiments of the invention if the slow fading processes are assumed uncorrelated, in equation (77) $\rho_u^{1,i} = \rho_u^{1,j}$ because i,j≠1 and $\rho_u^{i,j} = 0$ when i≠j; thus the generic element of $R_D$ becomes:

$$[R_D]_{ij} = \begin{cases} 2\sigma_u^2; & i = j \\ \sigma_u^2; & i \neq j \end{cases} \qquad (78)$$

The covariance matrix can be written as $$R_D = \sigma_u^2 \begin{bmatrix} 2 & 1 & \cdots & 1 \\ 1 & 2 & \ddots & \vdots \\ \vdots & \ddots & \ddots & 1 \\ 1 & \cdots & 1 & 2 \end{bmatrix} = \sigma_u^2 \{I + 1\} = \sigma_u^2 r_D \qquad (79)$$

where I and 1 are two (N−1)×(N−1) matrices:

$$I = \begin{bmatrix} 1 & 0 & \cdots & 0 \\ 0 & 1 & \ddots & \vdots \\ \vdots & \ddots & \ddots & 0 \\ 0 & \cdots & 0 & 1 \end{bmatrix}; \qquad (80)$$

$$1 = \begin{bmatrix} 1 & \cdots & 1 \\ \vdots & \ddots & \vdots \\ 1 & \cdots & 1 \end{bmatrix}$$

Using the assumption of slow fading uncorrelated and with equal variance, the probability density function (pdf) (75) can be written as follows $$f_{D|x,y}(D \mid x, y) = \qquad (81)$$

$$\frac{1}{(2\pi)^{N/2}\sigma_u|r_D|^{1/2}}\exp\left\{-\frac{1}{2\sigma_u^2}[D-m_D(x,y)]^T r_D^{-1}[D-m_D(x,y)]\right\}$$

The determinant of matrix $r_D$ and its inverse can be calculated explicitly:

$$|r_D| = N; \qquad (82)$$

$$r_D^{-1} = \frac{1}{|r_D|}\begin{bmatrix} (N-1) & -1 & \cdots & -1 \\ -1 & (N-1) & \ddots & \vdots \\ \vdots & \ddots & \ddots & -1 \\ -1 & \cdots & -1 & (N-1) \end{bmatrix}$$

$$= I - \frac{1}{N}\mathbf{1}$$

Substituting definitions (70) and (72) and the expression of $r_D^{-1}$ just obtained in the argument of the exponent in (81) it results:

$$[D - m_D(x,y)]^T r_D^{-1}[D - m_D(x,y)] = \qquad (83)$$

$$[D^2 - \mu_D^2, \ldots, D^N - \mu_D^N]^T\left\{I - \frac{1}{N}\right\}\begin{bmatrix} D^2 - \mu_D^2 \\ \vdots \\ D^N - \mu_D^N \end{bmatrix} =$$

$$\sum_{j=2}^{N}(D^j - \mu_D^j(x,y))^2 - \frac{1}{N}\left(\sum_{j=2}^{N}D^j - \mu_D^j(x,y)\right)^2$$

The location algorithms used in embodiments of the invention are applications of the Maximum Likelihood (ML) principle to the level and level difference observations defined above. The Maximum Likelihood principle as discussed previously is a method widely used in the estimation theory. A brief review of the maximum likelihood principle follows.

If $x \in D$ is an unknown random parameter defined in a certain domain D and y is an observed random parameter. The principle of the Maximum Likelihood (ML) provides an estimate of x by maximizing the joint probability density function (pdf) of x and y:

$$\hat{x}_{ML} = \underset{x \in D}{\operatorname{argmax}} f(x, y) \qquad (84)$$

The ML estimates can be also calculated by maximizing the natural logarithm of f(x,y), $\Lambda(x) = \ln f(x,y)$; usually referred to as the log-likelihood function:

$$\hat{x}_{ML} = \underset{x \in D}{\operatorname{argmax}} \Lambda(x) \qquad (85)$$

By writing f(x,y) as the product of the a posteriori probability density function of the observation y given the unknown x, f(y|x), and the prior probability density function for the unknown x, f(x). In other words the probability density function of a first unknown x, f(x), multiplied by the probability density function of the observation y conditional to the first unknown x, f(y|x). A similar expansion of the log-likelihood function becomes $\Lambda(x) = \ln f(y|x) + \ln f(x)$. In both cases the ML estimates can be calculated in embodiments of the present invention by solving the following problem:

$$\hat{x}_{ML} = \underset{x \in D}{\operatorname{argmax}}\{\ln f(y \mid x) + \ln f(x)\} \qquad (86)$$

If no prior probability density function for the unknown x is available, f(x) can be neglected (or equivalently, x can be assumed to be uniformly distributed over the domain D), resulting in the simplified form of equation (86) shown in equation (87).

$$\hat{x}_{ML} = \underset{x \in D}{\operatorname{argmax}}\{\ln f(y \mid x)\} \qquad (87)$$

In the context of MS location with signal level measurements, the observation y can be either the vector of level observations L defined in (49)

$$y \leftarrow L = [L^1, \ldots, L^N]^T; y \in R^{N \times 1} \qquad (88)$$

or the vector of level difference observations D defined in (70):

$$y \leftarrow D = [L^1 - L^2, \ldots, L^1 - L^N]^T; y \in R^{(N-1) \times 1} \qquad (89)$$

The parameter to be estimated x comprises in embodiments of the present invention the estimated MS coordinates (x,y) along with the estimated variance of the slow fading $\sigma_u^2$:

$$x = [\sigma_u^2, x, y]^T \qquad (90)$$

It is shown above that both level observations L and level difference observations D can be modelled as multivariate Gaussian random variables. In such circumstances the ML criterion (84) can be further simplified. If the observation $y \in R^{M \times 1}$ conditioned by the unknown parameter x is a M-variate Gaussian random variable with mean value $m_y \in R^{M \times 1}$ and correlation matrix $R_y \in R^{M \times M}$, the probability density function of observation y conditioned by x is $$f_{y|x}(y \mid x) = \qquad (91)$$

$$\frac{1}{(2\pi)^{M/2}|R_y(x)|^{1/2}}\exp\left\{-\frac{1}{2}[y - m_y(x)]^T R_y^{-1}(x)[y - m_y(x)]\right\}$$

where the dependence of $R_y$ and $m_y$ from x is explicitly indicated. The natural logarithm of $f_{y|x}(y|x)$ is $$\ln f(y \mid x) = \frac{M}{2}\ln 2\pi - \frac{1}{2}\ln|R_y(x)| - \frac{1}{2}[y - m_y(x)]^T R_y^{-1}(x)[y - m_y(x)] \qquad (92)$$

and the ML estimate of x can be calculated according to the ML criterion (89) as follows:

$$\hat{x}_{ML} = \underset{x \in D}{\operatorname{argmin}}\{\ln|R_y(x)| + [y - m_y(x)]^T R_y^{-1}(x)[y - m_y(x)]\} \qquad (93)$$

Equation (93) provides thus the ML criterion for MS location estimation when level observations and level difference observations comply with the Gaussian statistical models derived above. For simplicity, the following example is restricted to the cases in which the variance of slow fading from different BTS's is assumed equal (the statistical models for the observations are described above).

When N level observations are considered and the variance of the slow fading is assumed equal for all observations, the ML criterion for a Gaussian unknown (93) applies with the following definitions for y, $m_y(x)$, $R_y(x)$ and M in embodiments of the invention:

$$y \leftarrow L = [L^1, \ldots, L^N]^T$$

$$m_y(x) \leftarrow m_L(x,y)$$

$$R_y(x) \leftarrow \sigma_u^2 r_L(x,y)$$

$$M = N \tag{94}$$

where $$r_L(x,y) = \frac{1}{\sigma_u^2} R_L(x,y)$$

and $R_L(X,y)$ is the covariance matrix of the level observations L. The ML criterion to estimate x, y and $\sigma_u^2$ is thus:

$$\begin{bmatrix} \hat{\sigma}_u^2 \\ \hat{x} \\ \hat{y} \end{bmatrix} = \underset{\begin{bmatrix} \sigma_u^2 \\ x \\ y \end{bmatrix}}{\operatorname{argmin}} \left\{ \ln \sigma_u^2 + \ln|r_L(x,y)| + \frac{1}{\sigma_u^2}[L - m_L(x,y)]^T r_L^{-1}(x,y)[L - m_L(x,y)] \right\} \tag{95}$$

When N level observations are considered and the slow fading is assumed uncorrelated with equal variance for all observations, the ML criterion for a Gaussian unknown (93) applies with the following definitions for y, $m_y(x)$, $R_y(x)$ and M: in embodiments of the present invention.

$$y \leftarrow L = [L^1, \ldots, L^N]^T$$

$$m_y(x) \leftarrow m_L(x,y)$$

$$R_y(x) \leftarrow \sigma_u^2 I$$

$$M = N \tag{96}$$

The ML criterion to estimate x, y and $\sigma_u^2$ becomes:

$$\begin{bmatrix} \hat{\sigma}_u^2 \\ \hat{x} \\ \hat{y} \end{bmatrix} = \underset{\begin{bmatrix} \sigma_u^2 \\ x \\ y \end{bmatrix}}{\operatorname{argmin}} \left\{ \ln \sigma_u^2 + \frac{1}{\sigma_u^2} \|L - m_L(x,y)\|^2 \right\} \tag{97}$$

or analogously by inserting the values of $\|L - m_L\|$ given in equation 61.

$$\begin{bmatrix} \hat{\sigma}_u^2 \\ \hat{x} \\ \hat{y} \end{bmatrix} = \underset{\begin{bmatrix} \sigma_u^2 \\ x \\ y \end{bmatrix}}{\operatorname{argmin}} \left\{ \ln \sigma_u^2 + \frac{1}{\sigma_u^2} \sum_{i=1}^{N} (L^i + PL^i(x,y) + AP_{tr}^i(x,y))^2 \right\} \tag{98}$$

In embodiments of the present invention $\sigma_u^2$ can be estimated separately. For fixed x and y this estimation of $\sigma_u^2$ is equivalent to finding the (strictly positive) minimum of the function $f(s) = \ln s + K/s$, which is $s_{min} = K$. The estimated value of $\sigma_u^2$ results in $$\hat{\sigma}_u^2 = \sum_{i=1}^{N} (L^i + PL^i(\hat{x}, \hat{y}) + AP_{tr}^i(\hat{x}, \hat{y}))^2 \tag{99}$$

The ML estimation of x and y can be found in this embodiment of the invention by solving the following minimization problem:

$$\begin{bmatrix} \hat{x} \\ \hat{y} \end{bmatrix} = \underset{\begin{bmatrix} x \\ y \end{bmatrix} \in \mathcal{D}_{xy}}{\arg \min} \left\{ \sum_{i=1}^{N} (L^i + PL^i(x,y) + AP_{tr}^i(x,y))^2 \right\} \tag{100}$$

where $D_{xy}$ is the domain of existence of x and y.

The domain $D_{xy}$ can be determined in further embodiments of the present invention, for example, by using any of the additional location information available for implementation of Network Based Software Solutions (NBSS's) For instance, if the Cell Identity of the serving BTS is known, $D_{xy}$ can be defined in an embodiment of the invention as the geographical region served by such BTS. If in addition also the Timing Advance is available, $D_{xy}$ can be defined in a further embodiment as the geographical region determined by the intersection of the serving area of the BTS identified by the given CI. In a further embodiment $D_{xy}$ can be defined as a circular crown or ring with origin at the serving BTS coordinates and inner/outer radii determined according to the TA value, for example by using the techniques known in the art. Restricting the domain of x and y in embodiments of the invention, for example according to CI and TA, has two advantages: the first one is that the TA information is implicitly taken into account; the second one is that the convergence of the minimization algorithm is made faster.

When N−1 level difference observations are considered and the slow fading is assumed uncorrelated with equal variance for all observations, the ML criterion for Gaussian unknown (93) applies with the following definitions for y, $m_y(x)$, $R_y(x)$ and M:

$$y \leftarrow D = [L^1 - L^2, \ldots, L^1 - L^N]^T$$

$$m_y(x) \leftarrow m_D(x,y)$$

$$R_y(x) \leftarrow \sigma_u^2 r_D$$

$$M = N - 1 \tag{101}$$

where $r_D$ is the following (N−1)×(N−1) matrix (independent on the MS coordinates):

$$r_D = \begin{bmatrix} 2 & 1 & \cdots & 1 \\ 1 & 2 & \ddots & \vdots \\ \vdots & \ddots & \ddots & 1 \\ 1 & \cdots & 1 & 2 \end{bmatrix}_{(N-1) \times (N-1)} \tag{102}$$

The ML criterion to estimate x, y and $\sigma_u^2$ can be derived by using the result (83):

$$\begin{bmatrix} \hat{x} \\ \hat{y} \end{bmatrix} = \arg\min_{\begin{bmatrix} x \\ y \end{bmatrix} \in \mathcal{D}_{xy}} \left\{ \sum_{j=2}^{N} (D^j - \mu_D^j(x, y))^2 - \frac{1}{N} \sum_{j=2}^{N} (D^j - \mu_D^j(x, y))^2 \right\} \quad (103)$$

$$\hat{\sigma}_u^2 = \sum_{j=2}^{N} (D^j - \mu_D^j(\hat{x}, \hat{y}))^2 - \frac{1}{N} \left( \sum_{j=2}^{N} D^j - \mu_D^j(\hat{x}, \hat{y}) \right)^2$$

where $$D^j = L^1 - L^j \quad (j = 2, \ldots, N) \quad (104)$$

and $$\mu_D^j(x, y) = -[PL^1(d^1(x, y)) - PL^j(d^j(x, y))] - [AP_{tr}^1(\psi^1(x, y)) - AP_{tr}^j(\psi^j(x, y))] \quad (105)$$

$D_{xy}$ is the domain of existence of x and y. Several possible definitions for $D_{xy}$ are given later.

Restricting the domain of x and y, for example according to the values CI and TA, has two advantages: the first one is that the TA information is implicitly taken into account in the estimation; the second one is that the convergence of the minimization algorithm is made faster.

In further embodiments of the present invention alternative interpretations of the ML criterion exist. f(x,z) the joint probability density function of unknown x and observation z can be written as product of the conditional probability density function f(x|z) and the marginal probability density function of the observation f(z). The log-likelihood function can thus be written as $\Lambda(x) = \ln f(x|z) + \ln f(z)$ and the ML estimates is calculated by solving the following problem:

$$\hat{x}_{ML} = \arg\min_{x \in \mathcal{D}} \{\ln f(x|z) + \ln f(z)\} = \arg\max_{x \in \mathcal{D}} \{\ln f(x|z)\} \quad (106)$$

The second equality holds because f(z) does not depend on x. If the Maximum Likelihood estimate of x is inside the domain D, then it can be calculated as being the root of the following equation:

$$\frac{\partial}{\partial x} \ln f(x|z) = 0 \quad (107)$$

The location method used in further embodiments of the present invention are based on maximum likelihood criterion as defined in (106) where the observation z comprises CI and TA information from the serving BTS and CI's and RXLEV's (received level) values from all BTS's involved, and x comprises the unknown coordinates of the MS:

$$x = [x, y]^T \quad (108)$$

In location service applications, the knowledge of the CI of a certain cell implies that the geographical coordinates of the BTS antenna, as well as other parameters such as antenna orientation, cell width, transmitted power, etc, are known.

The ML estimate of the MS coordinates is determined in further embodiments of the present invention by solving the following minimization problem:

$$(\hat{x}, \hat{y}) = \arg\max_{(x,y) \in \mathcal{D}} \ln f(x, y | z) \quad (109)$$

or, alternatively, by calculating the roots inside the domain D of the following simultaneous equations:

$$\begin{cases} \dfrac{\partial}{\partial x} \ln f(x, y | z) = 0 \\ \dfrac{\partial}{\partial y} \ln f(x, y | z) = 0 \end{cases} \quad (110)$$

To apply the ML principle, in the form expressed above, the domain of the solution D and the conditional probability density function f(x,y|z) need to be determined. These are detailed below.

D is the domain where the location methods described in this document look for the solution $x = [x, y]^T$. D in (109) can be defined by using some a priori information on the region where the handset is possibly located. Several possibilities exist; four such methods used in embodiments of the invention are described below.

1. D Determined from Cell Identity (CI) of Serving Cell.

Figure 8:
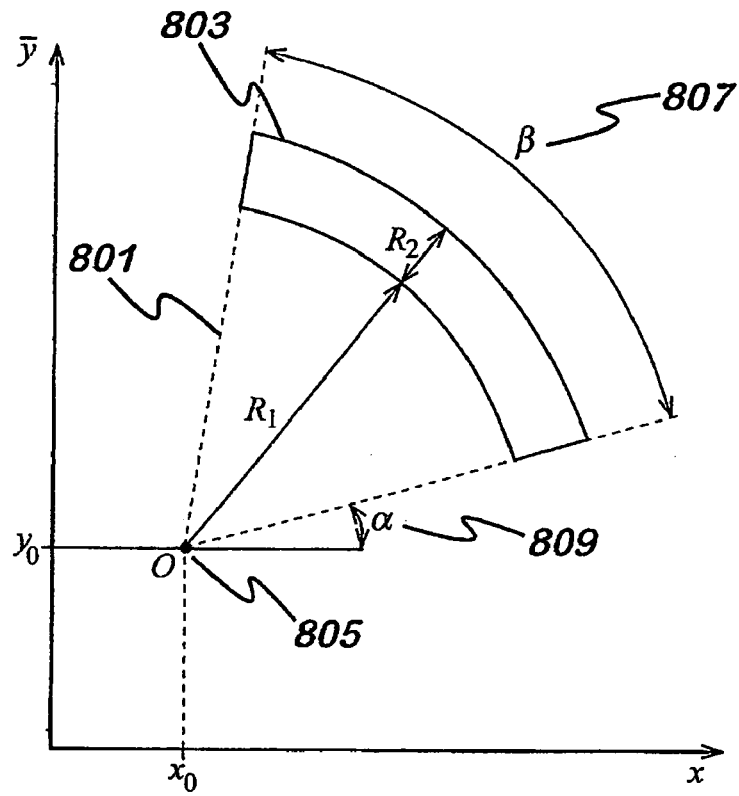
FIG. 8 shows a geometric estimate for the confidence region of a location estimate for a serving cell in a wireless network as shown in FIG. 1.

In this case, D represents the geographical region where handsets connected to the serving cell are most likely located. D can be thus defined as the confidence region associated to a location estimate based on the serving cell CI information. A method to determine such a confidence region is detailed later. FIG. 8 shows such a confidence region. The confidence region comprises the difference in area between two, unequal radii, circle segments 801, 803. The two segments 801, 803 with a common origin 805 and common arc angles 807 are defined by the following set of parameters: an origin 805 located at point with coordinates $(x_o, y_o)$, an inner radius $R_1$, an uncertainty radius $R_2$, a orientation angle 809 $\alpha$ and inclusion angle 807 $\beta$. The orientation angle 809 defines the angle from the x axis to the start of the arc. The inclusion angle 807 defines the angle from the start of the arc to the end of the arc.

2. D Determined from Cell Identity (CI) and Timing Advance (TA) of Serving Cell.

A method to determine the parameters of the confidence region as shown in FIG. 8 when, both the CI, and the TA information from the serving BTS is available (the TA, in particular, affects the radii $R_1$ and $R_2$). When the TA from serving cell is available, D can be thus determined with the method provided later eventually neglecting the cell sectorization (i.e., assuming $\alpha = 0$ and $\beta = 2\pi$).

3. D Determined from Cell Identity (CI) of All Cells Involved in Location Calculation.

Figure 9:
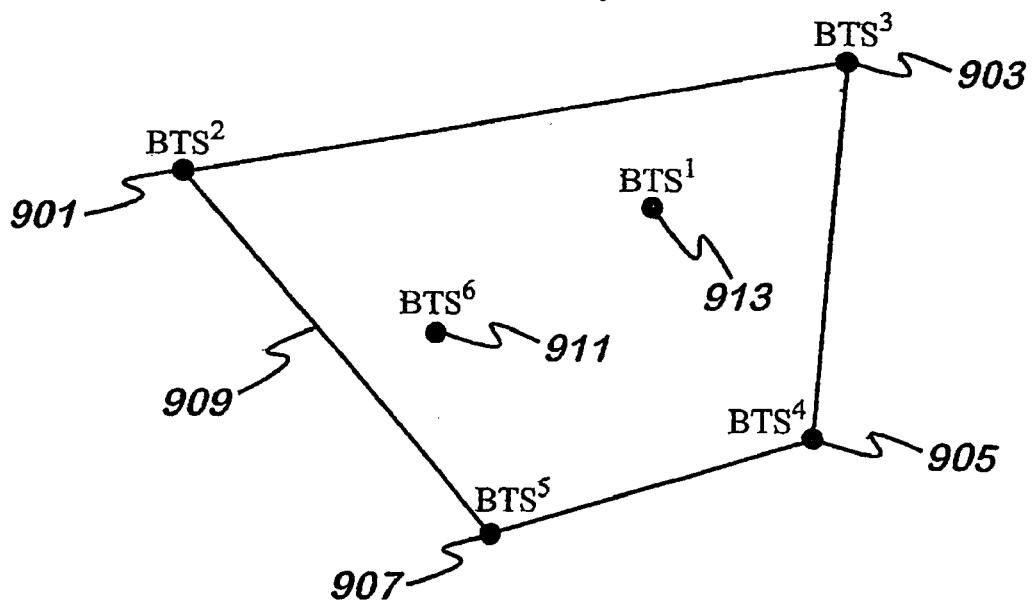
FIG. 9 shows the confidence region of a location estimate provided by a series of cell's cell identity.

The coordinates of the BTS's involved in the location estimation provide themselves an indication of the geographical region where the MS is located. D can be thus defined, for instance, by the convex polygon having vertices at the coordinates of the outermost BTSs involved in the location calculation. The concept is shown in FIG. 9. FIG. 9 shows six base transceiver stations (BTS) with the boundary of D defined by four BTS's 901, 903, 905, 907, and therefore defining a quadrilateral 909 and two BTS's 911, 913, located within this D region boundary 909.

4. D Determined from Coverage Prediction Maps.

Following the same criteria proposed in application PCT/EP01/01147 to determine the confidence region of a location estimate, coverage prediction maps for serving and/or neighbouring cells can be used to determine D. If the TA information from the serving BTS is available, the circular crown centred at the serving BTS coordinates with inner radius $R_1$ and outer radius $R_1 + R_2$ (as shown in FIG. 8) can be used in addition to coverage maps in determining D. FIG. 8 shows this area as the area difference between Expressions for the Probability Density Function f(x,y|z)

Several expressions for the probability density function f(x,y|z) are detailed below. In embodiments of the present invention the observation z comprises information derived from received level observations (RXLEV).

Given the following definitions:

N is the number of received level observations (RXLEV's) used to estimate the MS coordinates;

$P_r^1, \ldots, P_r^N$ are the received level observations (RXLEV's) measured by the MS from the N BTS's involved, expressed in decibel.

$P_{t,max}^1, \ldots, P_{t,max}^N$ are the maximum radiated power values from the N BTS's measured in decibels. The i-th maximum radiated power, $P_{t,max}^i$, represents the maximum power at the output of the i-th BTS antenna in the direction of maximum gain. The value $P_{t,max}^i$ as defined in equation (4) comprises transmitted power, $P_t^i$, maximum gain of the BTS transmit antenna, $G_{t,max}^i$, antenna losses, cable losses, etc.; all measured in dB. The total (positive) attenuation experienced by the signals transmitted by each of the N BTS's involved while propagating toward the MS can be expressed in decibels as $$z^i = P_{t,max}^i - P_r^i (i=1, \ldots, N) \tag{111}$$

The vector $z=[z^1, \ldots, z^N]^T$ represents the observation based on which the MS location is estimated according to criteria (109) or (110). The probability density function of interest here is thus $$f(x,y|z) = f(x,y|z^1, \ldots, z^N) \tag{112}$$

By using Bayes Theorem, f(x,y|z) can be expressed as follows:

$$f(x, y \mid z) = f(z \mid x, y) \frac{f(x, y)}{f(z)} \tag{113}$$

$$= \frac{f(z \mid x, y) f(x, y)}{\int_{-\infty}^{+\infty} \int_{-\infty}^{+\infty} f(z \mid x, y) f(x, y) dx dy}$$

f(z|x,y) needed in (113) can be evaluated by using the results from the above section, where the so-called multiple level observation $L=[L^1, \ldots, L^N]^T$ corresponds to −z defined in the present document. The most general expression for $f(z|x,y) = f_{L|x,y}(-L|x,y)$, is $$f(z \mid x, y) = \tag{114}$$
$$\frac{1}{(2\pi)^{N/2}|R_z(x, y)|^{1/2}} \exp\left\{-\frac{1}{2}[z - m_z(x, y)]^T R_z^{-1}(x, y)[z - m_z(x, y)]\right\}$$

where $R_z(x,y) = E\{zz^T\} - m_z m_z^T = R_L(x,y)$ is the covariance matrix of z, $m_z(x,y) = E\{z\} = [PL^1(d^1(x,y)) + AP_{tr}^1(\psi^1(x,y)), \ldots, PL^N(d^N(x,y)) + AP_{tr}^N(\psi^N(x,y))]^T = -m_L(x,y)$ is the mean value of z(x,y), $PL^i(d^i(x,y))$ and $AP_{tr}^i(\psi^i(x,y))$ are the combined Transmit-Receive antenna pattern and path-loss associated to the signal transmitted by the i-th BTS, respectively, $$\psi^i(x, y) = \tan^{-1} \frac{y^i - y}{x^i - x}$$

is the angle of arrival (AOA) of the same signal, $d^i(x,y) = \sqrt{(x^i-x)^2+(y^i-y)^2}$ is the distance between the MS and the i-th BTS and $(x^1,y^1), \ldots, (x^N,y^N)$ are the x,y coordinates of the N BTS's involved.

In absence of any other a priori information, the MS coordinates can be assumed uniformly distributed in D. This assumption leads to a joint probability density function of x and y defined as follows:

$$f(x, y) = \begin{cases} \frac{1}{M(\mathcal{D})} & (x, y) \in \mathcal{D} \\ 0 & (x, y) \notin \mathcal{D} \end{cases} \tag{115}$$

where M(D) is the size of D, and D can be determined using one of the methods described previously.

Substitution of (115) in (113) leads to the following expression for f(x,y|z):

$$f(x, y \mid z) = \begin{cases} \frac{f(z \mid x, y)}{\int\int_{\mathcal{D}} f(z \mid x, y) dx dy} & (x, y) \in \mathcal{D} \\ 0 & (x, y) \notin \mathcal{D} \end{cases} \tag{116}$$

which can be evaluated by using (112).

In a practical implementation it is very difficult to use (116) in the minimization problem (109). For this reason, alternative approximate definitions for f(x,y|z) need to be determined. f(x,y|z) can be written as product of the probability density functions conditioned by each single measured attenuation $f(x,y|z^1), \ldots, f(x,y|z^N)$:

$$f(x, y \mid z) = \prod_{i=1}^{N} f(x, y \mid z^i) \tag{117}$$

The i-th probability density function in (117) represents the likelihood of (x,y) given the attenuation measured from the i-th cell, $z^i$. Physically $f(x,y|z^i)$ represents the spatial distribution of the MS when the signal received by the MS from the i-th BTS experiences an attenuation $z^i$. One embodiment of the present invention described below, defines $f(x,y|z^i)$ in such a way that the x,y coordinates are uniformly distributed throughout a region, and defined by the observation $z^i$ and/or the radio coverage properties of the i-th cell. A further embodiment of the present invention also described later, does not assume the handsets are uniformly distributed but to instead assumes that the i-th cell is omni-directional, so that the handsets are assumed to be uniformly distributed angularly from the BTS site but not radially.

f(x,y $z^i$): uniform distribution over a region $D_i$

When the MS is assumed to be uniformly distributed in a certain geographical region $D_i$ associated to the i-th cell involved, $f(x,y|z^i)$ has the following expression $$f(x, y \mid z^i) = \begin{cases} \frac{1}{M(\mathcal{D}_i)} & (x, y) \in \mathcal{D}_i \\ 0 & (x, y) \notin \mathcal{D}_i \end{cases} \tag{118}$$

where $M(D_i)$ is the size of the region $D_i$. Several possibilities exist to determine $D_i$;

1. $D_i$ from Coverage Maps

If coverage maps generated by coverage prediction tools are available, $D_i$ in (118) can be defined as the Hearability area of the i-th cell, $H_i$. The hearability area identifies the geographical region where the signals radiated by the i-th BTS reach the handsets with a signal strength that is above the MS sensitivity level.

The definition (118) takes into account only the identity of the i-th BTS but does not use the actual observed attenuation. One further embodiment of the invention refines the definition of $f(x,y|z^i)$, by including the measured attenuation, is to substitute the hearability area with the coverage area of the i-th cell, $N_i$, which identifies the geographical region where the signals radiated by the i-th BTS reach the MS with the attenuation observed from the i-th BTS. From a practical point of view, it could be beneficial to consider a range of values for attenuation instead of a single value; for example $z^i \pm \Delta z^i$, to take into account with $\Delta z^i$ of the attenuation's random fluctuations. In this case $f(x,y|z^i)$ has the same definition as in (118), with $H_i$ substituted by $N_i$.

2. Analytical Expressions for $D_i$

Figure 10:
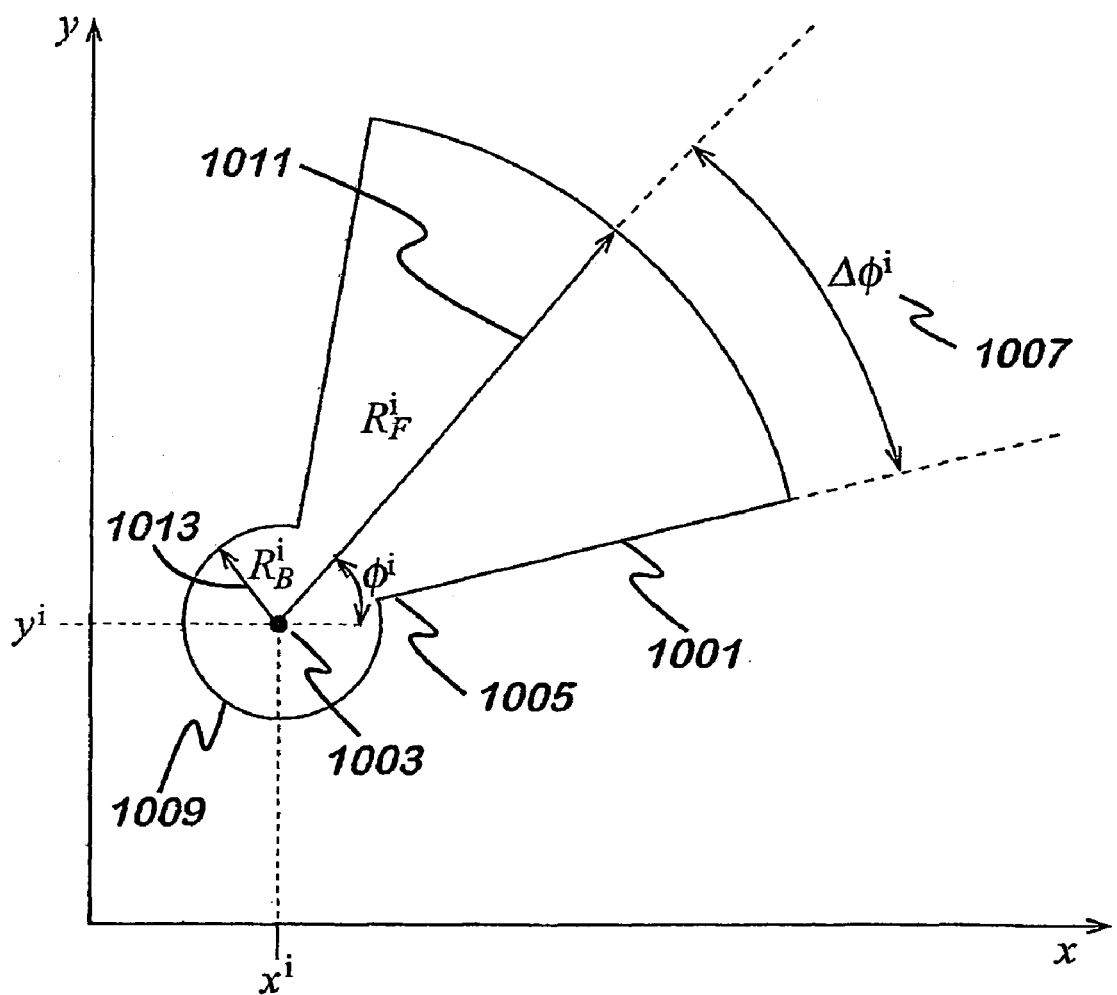
FIG. 10 shows a geometric representation of the coverage of a cell in a wireless cellular network as shown in FIG. 1.

In absence of coverage maps, $D_i$ in (118) may be expressed with many analytical functions. One possibility is to define $D_i$ as a generalized sector as shown in FIG. 10. FIG. 10 shows the area defined by $D_i$ as the area defined by the area defined by a segment of a circle 1001 with an origin given at coordinates of the i-th BTS $(x^i,y^i)$ 1003, a sector cell orientation 1005, $\phi^i$, a sector width of twice the angular width 1007 $\Delta\phi^i$. and a (front) radius 1011 $R_F^i$. The area defined is also that included within the area of a smaller circle 1009 with the same origin 1003 and a (back) radius 1013 $R_B^i$. The area $D_i$ can therefore be defined as follows:

$$\mathcal{D}_i: \begin{cases} (x-x^i)^2 + (y-y^i)^2 \le R_F^i; & 0 \le |\psi^i(x,y) - \phi^i| \le \Delta\phi^i \\ (x-x^i)^2 + (y-y^i)^2 \le R_B^i; & |\psi^i(x,y) - \phi^i| > \Delta\phi^i \end{cases} \quad (119)$$

where $$\Psi^i(x,y) = \tan^{-1}\frac{y^i - y}{x^i - x}$$

is the angle of arrival of the signal transmitted by the i-th BTS.

With the definition (119) for $D_i$, $M(D_i)$ in (118) is equal to $(R_F^i)^2\Delta\phi^i + (\pi - \Delta\phi^i)(R_B^i)^2$. In its most general definition, $D_i$ represents a sector cell, but can also represent an omni-directional cell, by setting $\Delta\phi^i = \pi$ and $R_B^i = 0$.

In an alternate embodiment of the present invention, $D_i$ can be defined as an ellipse with centre at a reference point of coordinates $(x_R^i, y_R^i)$ and with semi-axes $\sigma_{x,i}$ and $\sigma_{y,i}$:

$$\mathcal{D}_i(x,y): \frac{(x-x_R^i)^2}{\sigma_{x,i}^2} + \frac{(y-y_R^i)^2}{\sigma_{y,i}^2} \le 1 \quad (120)$$

With the definition (120) for $D_i$, $f(x,y|z^i)$ in (118) is a three-dimensional cylinder with constant height $$\frac{1}{M(D_i)} = \frac{1}{\pi\sigma_{x,i}\sigma_{y,i}}$$

and elliptical base. The general elliptical definition allows an approximation to the coverage of sector cells to be made, but can also be applied to omni-directional cells (by setting the origin $(x_R^i, y_R^i)$ at the i-th BTS coordinates and $\sigma_{x,i} = \sigma_{y,i} = R_F^i$ in (120), $D_i$ is identical to the one obtained with (119) for $\Delta\phi^i = \pi$ and $R_B^i = 0$).

$f(x,y|z^i)$: non uniform distribution for omni-directional cells

In further embodiments of the present invention the probability density function $f(x,y|z^i)$ can be calculated from the joint probability density function of the distance between the MS and the i-th BTS, $d^i$, and the angle of arrival from the same BTS $\psi^i(x,y)$, $f(d^i, \psi^i | z^i)$, as follows:

$$f(x,y | z^i) = f\left(d^i = \sqrt{(x-x^i)^2 + (y-y^i)^2}, \psi^i \right. \quad (121)$$

$$= \tan^{-1}\frac{y^i - y}{x^i - x} \left| z^i \right) |J(x,y)|$$

$$\text{Where } |J(x,y)| = \begin{vmatrix} \frac{\partial d^i}{\partial x} & \frac{\partial d^i}{\partial y} \\ \frac{\partial \psi^i}{\partial x} & \frac{\partial \psi^i}{\partial y} \end{vmatrix} = \quad (122)$$

$$\begin{vmatrix} \frac{x-x^i}{\sqrt{(x-x^i)^2 + (y-y^i)^2}} & \frac{y-y^i}{\sqrt{(x-x^i)^2 + (y-y^i)^2}} \\ -\frac{y-y^i}{\sqrt{(x-x^i)^2 + (y-y^i)^2}} & \frac{x-x^i}{\sqrt{(x-x^i)^2 + (y-y^i)^2}} \end{vmatrix} =$$

$$\frac{1}{\sqrt{(x-x^i)^2 + (y-y^i)^2}}$$

In the following example the case of the omni-directional cell is considered. In this example the MS angular coordinate $\psi^i$ can be assumed to be independent from the radial coordinate $d^i$ and uniformly distributed about the region $[-\pi, \pi]$. Using these assumptions the following simplified expression for $f(d^i, \psi^i | z^i)$ can be defined:

$$f \cdot (d^i, \psi^i | z^i) = \frac{1}{2\pi} f \cdot (d^i | z^i); |\psi^i| \le \pi, d^i \ge 0 \quad (123)$$

Strictly speaking, the i-th observed attenuation $z^i$ depends in general on the distance between MS and the i-th BTS, but also on the gain of the transmit antenna in the direction of the MS. If the cells are omni-directional, as assumed here, the antenna gain contribution can be neglected, since BTS antenna radiate uniformly in all directions and the attenuation can be considered as the function of the MS-BTS distance only. In this sense, the i-th attenuation z is equal to the i-th so-called path-loss $PL^i(d^i)$, dependent only on the distance between MS and the i-th BTS:

$$z^i = PL^i(d^i) \quad (124)$$

Thus in summary, the probability density function $f(x,y|z^i)$, with omni-directional cells can be obtained by inserting (122), (123), and (124) in (121), as follows:

$$f(x,y | z^i) = \quad (125)$$

$$\frac{1}{2\pi} f\left(d^i = \sqrt{(x-x^i)^2 + (y-y^i)^2} \middle| PL^i\right) \frac{1}{\sqrt{(x-x^i)^2 + (y-y^i)^2}}$$

It has been shown in experimental and theoretical studies that the average received signal power decreases logarithmically with the distance between transmitter and receiver, both in indoor and in outdoor environments; thus the path-loss at a distance $d \ge d_o$ in decibels can be expressed as $$PL(d) = PL(d_0) + 10n\log_{10}\left(\frac{d}{d_0}\right) + u; d \ge d_0 \quad (126)$$

where n is the environment-dependent propagation exponent, $d_o$ is the "close-in reference distance" and $PL(d_o)$ is the average path-loss experienced at a distance $d_o$ from the transmitter. In free space the value of n is 2 but the value n grows when the density of obstructions increases. Table 1 lists typical path-loss exponents in different environments.

TABLE 1

| Environment | Propagation exponent, n |
|---|---|
| Free space | 2 |
| Urban area cellular radio | 2.7 ÷ 3.5 |
| Shadowed urban area cellular radio | 3 ÷ 5 |
| In-building line of sight | 1.6 ÷ 1.8 |
| Obstructed in-building | 4 ÷ 6 |
| Obstructed in-factories | 2 ÷ 3 |

$d_o$ must also be selected on the basis of the environment. When cells are large, $d_o$ is usually set to 1 km; in case of micro-cells, the "close in reference distance" is usually smaller (it can vary from 1 m to 100 m). $PL(d_o)$ is therefore calculated in embodiments of the invention using experimental data. When this is not possible, $PL(d_o)$ can be estimated in further embodiments by using the free-space path loss law; if $d_o$ is close enough to the transmitter the idealized condition of propagation in free-space can be assumed ($\lambda=c/f$ is the signal wavelength, c is the speed of light and f the frequency):

$$PL_{free\ space}(d_0) = 10\log\left(\frac{4\pi d_0}{\lambda}\right)^2.$$

In the model (126) u represents the shadow fading affecting the signal transmitted by the i-th cell. It is generally modelled as a random variable with log-normal distribution with standard deviation $\sigma u$ (i.e., u measured in dB is a Gaussian random variable: $u \sim N(0, \sigma_u)$). Typical values for $\sigma_u$ range from 5 to 10 decibel. By defining $$A = PL(d_0) - 10n \log_{10} d_0 \quad (127)$$

$$B = 10n$$

the model (126) can be re-written as.

$$PL(d) = A + B \log_{10} d + u \quad (128)$$

(A well known model for the path-loss compliant with (128) is the Okumura-Hata model, where d is the distance between MS and BTS measured in kilometers, A and B are functions of signal frequency, f, base station effective antenna height, $h_B$, mobile terminal antenna height, $h_m$, and City Type (either "Large City" or "Small/Medium City"). The Okumura-Hata model is coherent with the formula (126) provided that $d_0=1$ km, $A=PL(d_0)$, and $B=10n$.)

For a given path-loss PL, the distance $d \geq d_0$ has the following expression $$d = 10^{\frac{PL-A-u}{B}} \quad (129)$$

For a given path-loss value and using the assumption of log-normal slow fading, the probability density function of d in (129) can be calculated with known standard random variable transformation techniques:

$$f(d|PL) = \frac{B/C(d_0)}{\sqrt{2\pi}\,\sigma_u \ln 10} \frac{1}{d} \exp\left\{-\frac{1}{2\sigma_u^2}(B\log_{10} d - PL + A)^2\right\}; \quad (130)$$

$$d \geq d_0$$

where $C(d_o)$ is a normalization factor introduced so that $\int_{d_0}^{\infty} f(\rho|PL)d\rho=1$:

$$C(d_0) = \int_{d_0}^{\infty} f(\rho|PL)d\rho \quad (131)$$

Inserting (130) in (125), the probability density function of x and y for a given observed attenuation from the i-th omni-directional cell (see (124)) is as follows:

$$f(x,y|z^i) = \frac{B^i/C^i(d_0)}{(2\pi)^{3/2}\sigma_u^i \ln 10} \quad (132)$$

$$\frac{\exp\left\{-\frac{1}{2\sigma_u^{i2}}\left(B^i \log_{10}\sqrt{(x-x^i)^2+(y-y^i)^2} - z^i + A^i\right)^2\right\}}{(x-x^i)^2+(y-y^i)^2}$$

valid for $d^i(x,y) = \sqrt{(x-x^i)^2+(y-y^i)^2} \geq d_0$.

Figure 11:
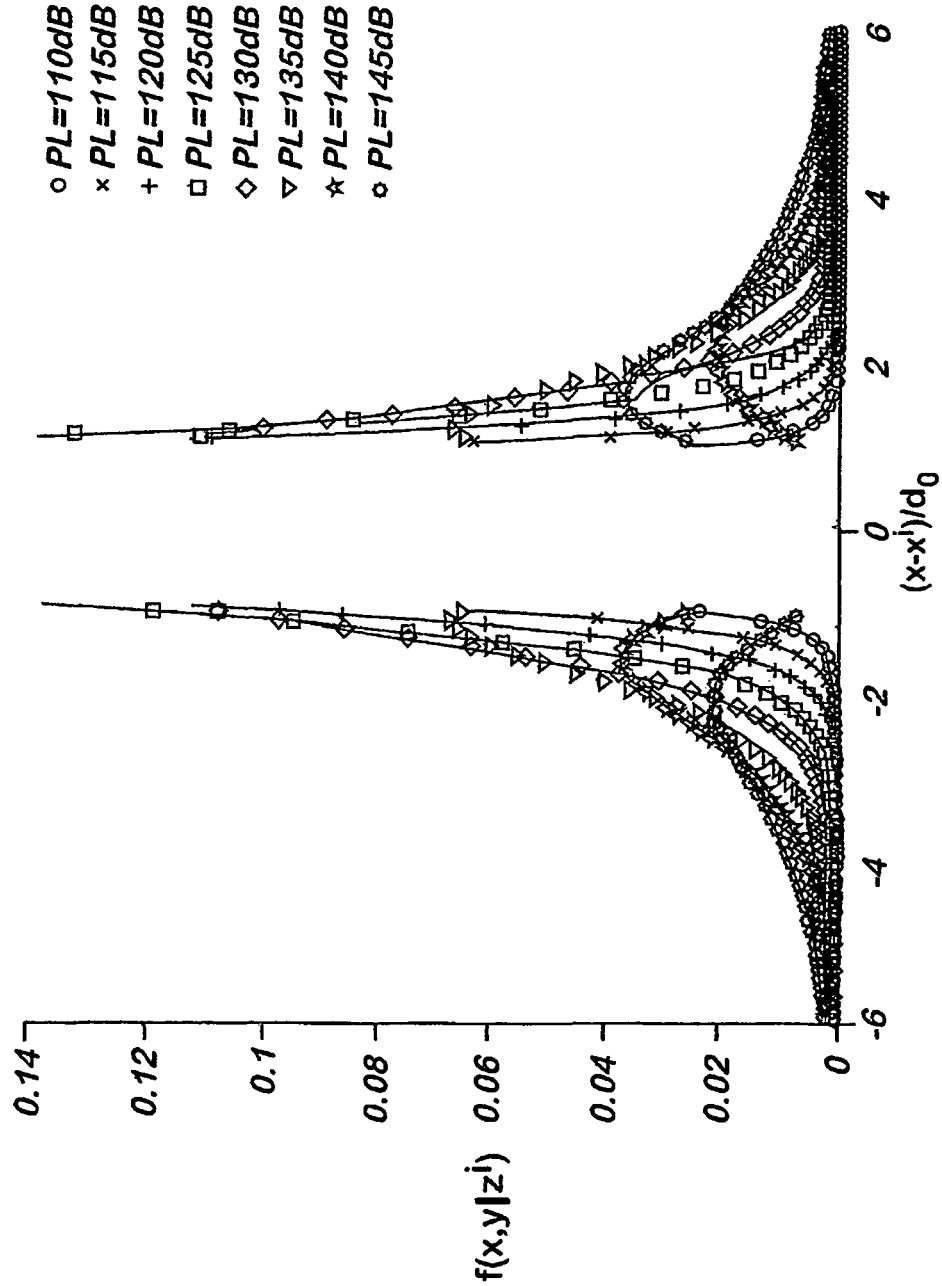
FIG. 11 shows a series of plots of the probability density function of a location estimate for various values of path loss/attenuation in a wireless cellular network as shown in FIG. 1.

FIG. 11 shows a series of plots of the probability density functions $f(x,y|z^i)$ using equation (132) for different values of attenuation $z^i = PL^i$. FIG. 11 shows that the probability density function has circular symmetry around the vertical axis going through the i-th BTS coordinates. It can be seen that, as the path-loss increases, the probability density function spreads. At low values of attenuation the probability density function curves peak close to the i-th BTS and rapidly fall towards zero as the distance from the i-th BTS increases. At higher values of attenuation the peaks of the probability density function curves move further away from the i-th BTS coordinates. As the value of attenuation increases the distribution becomes flatter—i.e. the peak probability density function value is smaller but the rate of increase and decrease of the probability density function is lower. This spreading produces the suggestion that at higher levels of attenuation the probability of handsets is further away from the BTS site grows.

$f(x,y|z^i)$: empirical Gaussian distribution for omni-directional cells

In embodiments of the present invention the probability density function $f(x,y|z^i)$ (132) is approximated by a bi-variate Gaussian probability density function defined as follows:

$$f_G(x,y|z^i) = \frac{1}{2\pi|R|^{1/2}} \exp\left\{-\frac{1}{2}[x-m]^T R^{-1}[x-m]\right\}, \quad (133)$$

where $$x = \begin{bmatrix} x \\ y \end{bmatrix} \quad (134)$$

$$m = E\{x|z^i\} = \begin{bmatrix} E\{x|z^i\} \\ E\{y|z^i\} \end{bmatrix} = \begin{bmatrix} \mu_{x,i} \\ \mu_{y,i} \end{bmatrix} \quad (135)$$

$$R = E\{xx^T\} - mm^T \quad (136)$$

$$= \begin{bmatrix} E\{x^2|z^i\} - (\mu_{x,i})^2 & E\{xy|z^i\} - \mu_{x,i}\mu_{y,i} \\ E\{xy|z^i\} - \mu_{x,i}\mu_{y,i} & E\{y^2|z^i\} - (\mu_{y,i})^2 \end{bmatrix}$$

To derive the Gaussian probability density function in (133), m and R (more precisely, its determinant $|R|$ and its inverse $R^{-1}$) must be determined. It can be noticed that the average values of x and y with probability density function $f(x,y|z^i)$ defined in (132) are $$\mu_{x,i} = E\{x \mid z^i\} = x^i; \mu_{y,i} = E\{y \mid z^i\} = y^i \text{ thus} \quad (137)$$

$$m = \begin{bmatrix} x^i \\ y^i \end{bmatrix} \quad (138)$$

To obtain an expression for the correlation matrix R in (136), the expected values $E\{x^2|z^i\}$, $E\{y^2|z^i\}$, and $E\{xy|z^i\}$ need to be calculated.

The analytic expression of $E\{x^2|z^i\}$ can be obtained as (the second equality in the following is obtained by solving the integral in polar coordinates:

$$\phi = \tan^{-1}\frac{y-y^i}{x-x^i}; \rho = \sqrt{(x-x^i)^2 + (y-y^i)^2} \;: \quad (139)$$

$$E\{x^2 \mid z^i\} = \int\int_{\sqrt{(x-x^i)^2+(y-y^i)^2} \geq d_0} x^2 f(x, y \mid z^i)dxdy$$

$$= \frac{B^i/C^i(d_0)}{(2\pi)^{3/2}\sigma_u^i \ln 10} \int_{-\pi}^{+\pi} d\phi \int_{d_0}^{+\infty} d\rho \rho (x^i + \rho\cos\phi)^2$$

$$\frac{\exp\left\{-\frac{1}{2\sigma_u^{i2}}(B^i\log_{10}\rho - z^i + A^i)^2\right\}}{\rho^2}$$

$$= \frac{B^i/C^i(d_0)}{(2\pi)^{3/2}\sigma_u^i \ln 10}(x^i)^2 \underbrace{\int_{-\pi}^{+\pi} d\phi}_{2\pi}\int_{d_0}^{+\infty}\frac{1}{\rho}$$

$$\exp\left\{-\frac{1}{2\sigma_u^{i2}}(B^i\log_{10}\rho - z^i + A^i)^2\right\}d\rho +$$

$$\frac{B^i/C^i(d_0)}{(2\pi)^{3/2}\sigma_u^i \ln 10}2x^i \underbrace{\int_{-\pi}^{+\pi}\cos\phi\, d\phi}_{0}\int_{d_0}^{+\infty}$$

$$\exp\left\{-\frac{1}{2\sigma_u^{i2}}(B^i\log_{10}\rho - z^i + A^i)^2\right\}d\rho +$$

$$\frac{B^i/C^i(d_0)}{(2\pi)^{3/2}\sigma_u^i \ln 10}\underbrace{\int_{-\pi}^{+\pi}\cos^2\phi\, d\phi}_{\pi}\int_{d_0}^{+\infty}\rho$$

$$\exp\left\{-\frac{1}{2\sigma_u^{i2}}(B^i\log_{10}\rho - z^i + A^i)^2\right\}d\rho$$

$$= (x^i)^2 \tilde{I}_i + I_i$$

where $\tilde{I}_i$ and $I_i$ represent, respectively, the first and third integrals above:

$$\tilde{I}_i = \frac{1}{2C^i(d_0)}\text{erfc}\left(\frac{B^i\log_{10}d_0 - z^i + A^i}{\sqrt{2}\,\sigma_u^i}\right) \quad (140)$$

$$I_i = \frac{1}{4C^i(d_0)}\exp\left\{2\frac{\ln 10}{B^i}\left(z^i - A^i + \frac{\sigma_u^{i2}\ln 10}{B^i}\right)\right\}$$

$$\text{erfc}\left(\frac{B^i\log_{10}d_0 - z^i + A^i - 2\frac{\sigma_u^{i2}\ln 10}{B^i}}{\sqrt{2}\,\sigma_u^i}\right)$$

The following definition for the complementary error function is used.

$$\frac{1}{2}\text{erfc}\left(\frac{u}{\sqrt{2}}\right) = \int_u^\infty \frac{e^{-\theta^2/2}}{\sqrt{2\pi}}d\theta \quad (141)$$

With a very similar derivation, it can be proved that $E\{y^2|z^i\}$ has the following expression:

$$E\{y^2|z^i\} = (y^i)^2 \tilde{I}_i + I_i \quad (142)$$

Finally, the analytic expression of the correlation term $E\{xy|z^i\}$ can be obtained:

$$E\{xy \mid z^i\} = \int\int_{\sqrt{(x-x^i)^2+(y-y^i)^2} \geq d_0} xy f(x, y \mid z^i)dxdy \quad (143)$$

$$= \frac{B^i/C^i(d_0)}{(2\pi)^{3/2}\sigma_u^i \ln 10}\int_{-\pi}^{+\pi}d\phi\int_{d_0}^{+\infty}d\rho\rho$$

$$(x^i + \rho\cos\phi)(y^i + \rho\sin\phi)$$

$$\frac{\exp\left\{-\frac{1}{2\sigma_u^{i2}}(B^i\log_{10}\rho - z^i + A^i)^2\right\}}{\rho^2}$$

$$= x^i y^i \tilde{I}_i$$

Using the results (139), (142), and (143) in the definition for R given in equation (136), the following R results $$R = \begin{bmatrix} I_i + (x^i)^2(\tilde{I}_i - 1) & x^i y^i(\tilde{I}_i - 1) \\ x^i y^i(\tilde{I}_i - 1) & I_i + (y^i)^2(\tilde{I}_i - 1) \end{bmatrix}. \quad (144)$$

The determinant of R being $|R|=(I_i)^2+(x^i)^2 I_i(\tilde{I}_i-1)+(y^i)^2 I_i(\tilde{I}_i-1)$ and its inverse being $$R^{-1} = \frac{1}{|R|}\begin{bmatrix} I_i + (x^i)^2(\tilde{I}_i - 1) & -x^i y^i(\tilde{I}_i - 1) \\ -x^i y^i(\tilde{I}_i - 1) & I_i + (y^i)^2(\tilde{I}_i - 1) \end{bmatrix}. \quad (145)$$

With the above results it is possible to define the Gaussian probability density function as shown in equation (139) as follows:

$$f_G(x, y \mid z^i) = \frac{1}{2\pi|R|^{1/2}}\exp\left\{\frac{-1}{2|R|}\left[I_i(x-x^i)^2 + I_i(y-y^i)^2 + \right.\right. \quad (146)$$

$$(\tilde{I}_i - 1)(x^i(x-x^i) - y^i(y-y^i))^2$$

In further embodiments of the present invention the use of the path-loss model (128) is extended to distances below the close-in distance (i.e., for $d<d_o$) or, alternatively, the close-in distance is made tend to $d_o \to 0$ the above functions remain well behaving and the probability density function tends to zero as d tends to zero. In the limit $d_o \to 0$, the term $\tilde{I}_i$ tends to 1 (in fact, $(0.5)\text{erf}\{c(-\infty)\}=1$), $C^i(d_0) \to 1$, and $$|R| \to (I_{io})^2; R^{-1} \to \frac{1}{x_{io}}\begin{bmatrix} 1 & 0 \\ 0 & 1 \end{bmatrix}(d_0 \to 0) \text{ where} \quad (147)$$

$$I_{iO} = \lim_{d_0 \to 0} I_i = \frac{1}{2}\exp\left\{2\frac{\ln 10}{B^i}\left(z^i - A^i + \frac{\sigma_u^{i2}\ln 10}{B^i}\right)\right\} \quad (148)$$

Inserting the above result for $d_0 \to 0$ into (133), the following approximated Gaussian probability density function results:

$$f_{G0}(x,y|z^i) \frac{1}{2\pi I_{i0}} \exp\left\{-\frac{(x-x^i)^2 + (y-y^i)^2}{2I_{i0}}\right\} \quad (149)$$

In FIG. 12, the behaviour of $I_{i0}$ as a function of the path-loss/attenuation $z^i$ is shown. FIG. 12 shows a graph of $I_{i0}$ of range 0 to 8 against path loss/attenuation $z^i$ of range 110 to 145 dB. The graph plot resembles an exponential type plot with a $I_{i0}$ of slightly above 0 at $z^i=110$ dB rising initially slowly but increasing rapidly as $Z^i$ passes 140 dB.

$f(x,y|z^i)$: non uniform distribution for omni-directional cells

The location algorithms in further embodiments may be applied to non uniform probability density functions in omnidirectional cells. By taking logarithms of the terms from equation (117), the minimization problem can be rewritten as $$(\hat{x},\hat{y}) = \arg\max_{(x,y)\in\mathcal{D}} \sum_{i=1}^{N} \ln f(x,y|z^i) \quad (150)$$

or, alternatively, $$\begin{cases} \sum_{i=1}^{N} \frac{\partial}{\partial x} \ln f(x,y|z^i) = 0 \\ \sum_{i=1}^{N} \frac{\partial}{\partial y} \ln f(x,y|z^i) = 0 \end{cases} \quad (151)$$

As described above, equation (138), defines the probability density function $f(x,y|z^i)$ in the environment created by omnidirectional cells, based on the logarithmic path-loss model (128). By using this definition for the probability density function $f(x,y|z^i)$, the following expressions for the partial derivatives can be found $$\begin{cases} \frac{\partial}{\partial x} \ln f(x,y|z^i) = F^i(x,y)(x-x^i) \\ \frac{\partial}{\partial y} \ln f(x,y|z^i) = F^i(x,y)(y-y^i) \end{cases} \quad (152)$$

where $$F^i(x,y) = \frac{2B^i/C^i(d_0)}{(2\pi)^{3/2}\sigma_u^i \ln 10} \quad (153)$$

$$\frac{\exp\left\{-\frac{1}{2\sigma_u^{i2}}(B^i\log_{10}d^i(x,y) - z^i + A^i)^2\right\}}{[d^i(x,y)]^4} \cdot$$

$$\left[\frac{B^i(B^i\log_{10}d^i(x,y) - z^i + A^i)}{2\sigma_u^{i2} \ln 10} - 1\right]$$

The MS location can be thus estimated in further embodiments of the present invention by solving iteratively the following set of simultaneous nonlinear equations $$\begin{cases} \sum_{i=1}^{N} F^i(x,y)(x-x^i) = 0 \\ \sum_{i=1}^{N} F^i(x,y)(y-y^i) = 0 \end{cases} ;(x,y)\in\mathcal{D} \quad (154)$$

Equation 154 defines algorithm D which is a non linear algorithm.

$f(x,y|z^i)$: empirical Gaussian distribution for omni-directional cells

Earlier two Gaussian approximations to the probability density function $f(x,y|z^i)$ were defined. The first approximation provided was $f_G(x,y|z^i)$, in equation (146). By using such expression, the following partial derivatives result:

$$\begin{cases} \frac{\partial}{\partial x} \ln f(x,y|z^i) = \left[-\frac{I_i}{|R|}(x-x^i) - \frac{(\tilde{I}_i-1)}{|R|}\{(x^i)^2 x - x^i y^i (y-y^i)\}\right] \\ \frac{\partial}{\partial y} \ln f(x,y|z^i) = \left[-\frac{I_i}{|R|}(y-y^i) - \frac{(\tilde{I}_i-1)}{|R|}\{(y^i)^2 y - x^i y^i (x-x^i)\}\right] \end{cases} \quad (155)$$

Where the determinant of R is given by $|R|=(I_i)^2+(x^i)^2 I_i(\tilde{I}_i-1)+(y^i)^2 I_i(\tilde{I}_i-1)$. The MS location can be thus estimated in embodiments of the invention by solving iteratively the following set of simultaneous nonlinear equations:

$$\begin{cases} \sum_{i=1}^{N}\left[-\frac{I_i}{|R|}(x-x^i) - \frac{(\tilde{I}_i-1)}{|R|}\{(x^i)^2 x - x^i y^i (y-y^i)\}\right] = 0 \\ \sum_{i=1}^{N}\left[-\frac{I_i}{|R|}(y-y^i) - \frac{(\tilde{I}_i-1)}{|R|}\{(y^i)^2 y - x^i y^i (x-x^i)\}\right] = 0 \end{cases} \quad (156)$$

$(x,y) \in \mathcal{D}$

Equation 156 defines algorithm E which is a non linear, iterative algorithm. The second approximation for the probability density function $f(x,y|z^i)$ given in section is $f_{G_o}(x,y|z^i)$ in equation (149). This probability density function is obtained as a limit of the first Gaussian approximation, $f_G(x,y|z^i)$, in the limiting condition $d_o \to 0$. By using such expression, the problem simplifies noticeably; in fact the following partial derivatives result:

$$\begin{cases} \frac{\partial}{\partial x} \ln f(x,y|z^i) = -\frac{x-\mu_{x,i}}{I_{i0}} \\ \frac{\partial}{\partial y} \ln f(x,y|z^i) = -\frac{y-\mu_{y,i}}{I_{i0}} \end{cases} \quad (157)$$

where $\mu_{x,i}=x^i$, $\mu_{y,i}=y^i$ and $I_{i0}$ defined in (148), depends on the i-th attenuation $z^i$. With the result above, the MS location estimate can be calculated in embodiments of the invention in closed form as follows:

$$\hat{x} = \frac{\sum_{i=1}^{N} \frac{x^i}{I_{i0}}}{\sum_{i=1}^{N} \frac{1}{I_{i0}}}; \quad \hat{y} = \frac{\sum_{i=1}^{N} \frac{y^i}{I_{i0}}}{\sum_{i=1}^{N} \frac{1}{I_{i0}}}; \quad (\hat{x},\hat{y}) \in \mathcal{D} \quad (158)$$

Equation 158 defines algorithm F which is a linear algorithm with a closed form solution.

Extensions of the closed-form method

In the algorithm defined by equation (100) and used in embodiments of the present invention the estimated x (and respectively, y) MS coordinate is obtained as a weighted average of the x (and respectively, y) BTS coordinates, the signal of which is received by the MS. This algorithm can be extended by means of the following formulation:

$$\hat{x} = \frac{\sum_{i=1}^{N} w^i x^i}{\sum_{i=1}^{N} w^i}; \quad \hat{y} = \frac{\sum_{i=1}^{N} w^i y^i}{\sum_{i=1}^{N} w^i}; \quad (\hat{x}, \hat{y}) \in \mathcal{D} \tag{159}$$

where $w^1, \ldots, w^N$ are suitable weights assigned to each one of the N BTS's involved.

The weights in the algorithm (158) are calculated as the reciprocals of the terms $I_{10}, \ldots, I_{N0}$. The weights being calculated in such a way that the weights decrease as the attenuation increases, as can be seen also from FIG. 11. It is possible to suggest that the signals transmitted by BTS's closer to the MS undergo lower attenuation than signals transmitted by BTS's located further away from the mobile device. This suggestion can be accounted for by imposing the rule that the weights in the generalized closed-form algorithm (159) are defined in such a way that, if the attenuation of the signal received from the i-th BTS is low, then $w^i$ is high, and vice versa:

$$z^i \nearrow \Rightarrow w^i \searrow \tag{160}$$

Hereafter follows three empirical definitions for the weights $w^1, \ldots, w^N$ according to criterion suggested above as used in further embodiments of the present inventions.

1. Definition of Weights

The first definition of the weights which reflects the above rules comprises defining the i-th weight as the reciprocal of the attenuation experienced by the signal transmitted by the i-th BTS:

$$w^i = \frac{1}{z^i} \tag{161}$$

This definition of weights is further enhanced in further embodiments of the present invention by the introduction of auxiliary variable parameters to be determined by using experimental measurements.

2. Definition of Weights

A further definition for the i-th weight used in embodiments of the present invention is to use the inverse of the estimated distance, $\hat{d}^i$, between the MS and the i-th BTS, obtained from the i-th observed attenuation $z^i$:

$$w^i = \frac{1}{\hat{d}^i} \tag{162}$$

The level of the signal received by a MS (and the attenuation as well) does not only depend on the distance between MS and BTS, but also on the gain of the transmit antenna in the direction if the MS. However, if the N BTS's involved in the location calculation are omni-directional, the contribution of the BTS antennas can be neglected and the attenuation can be considered to be a function of the MS-BTS distance only. For this approximation, the i-th attenuation $Z^i$ is equal to the i-th path-loss $PL^i(d^i)$, and is dependent only on the distance between MS and the i-th BTS $d^i = \sqrt{(x-x^i)^2 + (y-y^i)^2}$:

$$z^i = PL^i(d^i) \tag{163}$$

Neglecting the slow-fading in model (128), the following expression for the weights as given in (162) produces the following:

$$w^i = \frac{1}{\hat{d}^i} = 10^{-\frac{PL^i - A}{B}} = 10^{-\frac{P^i_{t,max} - P^i_r - A}{B}} \tag{164}$$

A further alternative can be found when the weights defined in (164) are adjusted to fit experimental measurements. Two observations, described below, can be made in order to produce more accurate weights to be found:

Since the MS coordinates are estimated using (159) with weights given by (162), the absolute values of the distances are not strictly needed. In the algorithm defined in equation (159) only the ratios $$\frac{1/\hat{d}^i}{\sum_{i=1}^{N} 1/\hat{d}^i}$$

contribute to the location estimate. This means that if the same relative error is made in estimating each of the distances used in the location calculation, the resulting location estimate is not affected. This automatic error cancellation factor means that going from outdoor to indoor or from open area in a city to narrow city canyon should not greatly affect the location accuracy. This error cancellation factor improves the accuracy of the location estimate and minimizes the need to use a highly optimised and parameterised path-loss model in embodiments of the invention.

For a location estimate calculation using the algorithm (159) and weights (164) only the functional behaviour of the distance as a function of the received signal strength is needed. In a simplified example, if the base station antenna height, central frequency, maximum radiated power are the same for each BTS used in the location calculation almost all the terms of the Okumura-Hata path loss model cancel out and the resulting weights to be used in the location calculation simplify so that the weights can be found by the equation (165):

$$w^i = 10^{-\frac{P^i_r}{B}} \tag{165}$$

3. Definition of Weights

A further embodiment of the present invention determines experimentally a functional relation between the weights, $w^i$, and attenuation, $z^i$. It is possible to collect a sufficient amount of received level (RXLEV) measurements, with corresponding GPS coordinates to be used to reference the exact MS locations, and from this information solve the reverse location problem: if the MS coordinates are known in equation (159), the weights $w^1, \ldots, w^N$ can be determined as a function of the attenuation by minimizing the error between estimated MS coordinates and exact MS coordinates. This approach fails where experimental measurements are not available.

The location methods described above apply to a network made from omni-directional cells, where the BTS's transmit antennas radiate isotropically in all directions. In sector cells, the assumptions made in an all omni-directional cell environment hold with a reasonable level of approximation error only when the MS is located in the main lobe region (MLR). In other words when the mobile device is in the region illuminated by the main beam of the BTS (directional) antenna. A sector cell equipped with a transmit antenna having Half Power Beam Width (HPBW) of 60° has a MLR which approximately extends angularly ±60 degrees about the direction towards which the BTS antenna is oriented.

In further embodiments of the present invention, the algorithms defined in equations (154), (156), (158), and (159) are applied if the N BTS's involved in the location calculation, out of the total number of values received by the MS, are those that radiate the MS with the main beam of their transmit antennas.

Unfortunately it is not possible to determine whether the MS is in the MLR of a certain BTS from a single BTS received value because, in order to obtain this information, the location of the MS is needed. However, in embodiments of the present invention it is possible to determine with a low error rate if the MS is in the MLR of a certain sector cell when the MS measures and compares the received levels (RX-LEVs) from different co-located sector cells. In this case, as the BTS antennas of co-located sector cells have different orientations, the MS is most likely located in the MLR of the cell the signal of which experiences the lowest attenuation among the co-located sector cells.

With the knowledge gathered by the method above the approximation found from the use of omni-directional cells is accurate (e.g., and embodiments of the present invention may apply the algorithms defined in equations (154), (156), (158), and (159)) if the N BTS's involved in the location calculation are selected out of the ones measured by the MS according to the following procedure:

1. Select all omni-directional cells measured by the MS.
2. Select all sector cells, where no co-located cells are measured by the MS at the same time.
3. Select the sector cell with the lowest attenuation out of the co-located sector cells, where co-located cells are detected by the MS.

If one or more of the discarded co-located cells produce a received level value attenuation that differs from the selected cell by an amount by a certain range (say 5 dB), select these co-located cells also and the average of the attenuation in embodiments of the present invention or in further embodiments of the present invention use the attenuation values of all of the selected co-located cells.

CI and CI+TA Based Algorithms

These algorithms will be described in more detail hereinafter. These algorithms are linear and rely only on serving cell information. They both deliver a location estimate and a confidence region for the location estimate.

These algorithms are considered to act upon a mobile device being serviced by one generalised sector cell with a coverage or hearability area defined analytically or by practical measurements. The generalised cell is a simplification of the effect produced by the BTS antenna angular gain to both transmit and receive as shown by the practical antenna gain shown in FIG. 5.

As explained previously and as shown in FIG. 10 the generalised cell is defined by a series of parameters comprising, $\phi$ the sector orientation in degrees from the x-axis, $\Delta\phi$ the sector angular width, $R_F$ the sector front radius, and $R_B$ the sector back radius.

The parameters defining the generalised sector may be found from coverage maps or coverage prediction tools. The input information required by the method comprises, the Cell Identity of the serving BTS (CI), the serving BTS coordinates; and the map of the serving cell.

The steps performed to calculate the generalised cell parameters from a coverage map of the cell comprise:

1. Selecting the Coordinates of the Serving BTS Using the CI: $x_s, y_s$.

Given the CI of the serving cell, the x-y coordinates of the cell are identified the CI, $(x_s, y_s)$, and are retrieved from the database of BTS-coordinates.

2. Selecting the Serving Cell Map: S

Analogously as in the previous step, the CI is used to select the serving map, S, corresponding to the current CI. S is typically determined by a network planning tool which uses a large set of information such as BTS configuration parameters, 3-dimensional terrain maps, tuned propagation models, etc. and, in order to determine the serving area, takes into account also the presence of other BTS's in the network.

The serving map represents the geographical region where the cell identified by CI is serving. In an arbitrary x-y Cartesian system, S can be obtained by dividing the region into elements of area $(\Delta x)\times(\Delta y)$ and representing each element by the coordinates of its centre:

$$S: \{x_n, y_n\}; n=1, \ldots, N_S \qquad (166)$$

The coordinates $(x_n, y_n)$ represent the centre of the n-th pixel of area $(\Delta x)\times(\Delta y)$ where the cell is serving.

An example of serving area is shown in FIG. 13. FIG. 13 shows a base transceiver station (BTS) 1301, a main coverage area 1303 and minor coverage areas 1305. The base transceiver station 1301 lies within the main coverage area 1303. Smaller coverage areas 1305 are positioned adjacent to but not touching the edges of the main coverage area 1303. All of the coverage areas are divided into a plurality of elements 1309 by a grid system 1307. The total of all of the coverage areas dependent on the BTS is known as the serving area for the BTS.

3. Determination of the Coordinates of the Centre of Mass of the Serving Map: $x_{mc}, y_{mc}$ The (x,y) coordinates of the serving cell's mass centre are formally defined as follows:

$$x_{MC} = \frac{1}{M(S)}\int_S x\,dx\,dy; \quad y_{MC} = \frac{1}{M(S)}\int_S y\,dx\,dy \qquad (167)$$

where M(S) is the area of the serving map:

$$M(S) = \int_S dx\,dy \qquad (168)$$

By using the divided elements defined in equation (166) the coordinates of the mass centre can be calculated as follows:

$$x_{MC} \simeq \frac{1}{N_S}\sum_{n=1}^{N_S} x_n; \quad y_{MC} \simeq \frac{1}{N_S}\sum_{n=1}^{N_S} y_n \qquad (169)$$

4. It is much easier to calculate the desired estimates in a polar reference system $(\rho_i, \theta_i)$ originated in the serving BTS of coordinates $(x_s, y_s)$. In this polar coordinate system $\rho_i$ is the distance of the point $(x_i, y_i)$ from the BTS and $\theta_i$ is the angle measured counter-clockwise from the x-axis:

$$\rho_i = \sqrt{(x_S - x_i)^2 + (y_S - y_i)^2}\,; \theta_i = \tan^{-1}\frac{y_S - y_i}{x_S - x_i}. \quad (170)$$

In the polar reference system the serving map is represented by a set of points:

$$S_{polar}: \{\rho_n, \theta_n\}; n = 1, \ldots, N_S. \quad (171)$$

5. Determination of the Main Direction for the Entire Serving Map: $\phi_{mc}$

The main direction $\theta_{mc}$ provides an indication of the serving sector's bearing, $\phi_s$. This angle is used as a reference direction for normalizing the angular coordinates of the cell's coverage area elements. $\theta_{mc}$ can be approximated as the orientation of the cell's mass centre from the BTS coordinates.

In the polar reference system $(\rho, \theta)$ the mass centre of the serving area has coordinates $(\rho_{mc}, \theta_{mc})$ such that:

$$\rho_{MC} = \sqrt{(x_S - x_{MC})^2 + (y_S - y_{MC})^2}\,; \theta_{MC} = \tan^{-1}\frac{y_S - y_{MC}}{x_S - x_{MC}} \quad (172)$$

6. To further simplify the actual calculation of the estimates the new polar reference system is rotated in such way that zero and $2\pi$ angles are as far as possible from the most important serving area. After this rotation all the needed estimates can be calculated using a known simple sorting algorithm.

The rotation of the m-th pixel with angular coordinate $\theta_m$, is defined as follows:

$$\delta_m = \begin{cases} \theta_m - \theta_R + 2\pi & \text{if } \theta_m - \theta_R < 0 \\ \theta_m - \theta_R & \text{if } \theta_m - \theta_R \geq 0 \end{cases} \quad (173)$$

where $$\delta_R = \begin{cases} \theta_{MC} + \pi & \text{if } \theta_{MC} < \pi \\ \theta_{MC} - \pi & \text{if } \theta_{MC} \geq \pi \end{cases} \quad (174)$$

The resulting $\delta_m$'s are in the range $0 < \delta_m < 2\pi$. The directions $\delta_m$'s closest to the main direction $\theta_{mc}$ are associated to $\delta_m \cong \pi$ and the directions furthest away from $\theta_{mc}$ are associated to $\delta_m \cong 0$ and $\delta_m \cong 2\pi$.

Next step is to sort the points in order of increasing distance from the serving BTS:

$$\{\rho_l, \delta_l\}_{l=1}^{N_S} = \text{sort}\{\rho_l\}. \quad (175)$$

At this position the serving map is represented by an ordered set of points:

$$S_{polar}: \{\rho_n, \delta_n\}; n = 1, \ldots, N_S. \quad (176)$$

7. Determination of the Front Radius, $R_F$:

$$R_F = \rho_{l|l=\lceil N_{S_f} \rceil}. \quad (177)$$

where $\lceil \cdot \rceil$ rounds • to the nearest integer towards plus infinity fusing the known ceiling operation where all numbers are rounded up towards the next positive integer) and, $\gamma'$ determines the desired fraction of points in set $S_{polar}$ to have the distance from serving BTS less than $R_F$. A good value for the parameter, $\gamma'$ is between 0.95 and 0.98, in some embodiments of the invention.

8. Determination of back radius $(R_B)$, orientation as a function of distance from serving BTS $(\phi_s(d))$, and angular width as a function of distance from serving BTS $(\Delta\phi_s(d))$.

Figure 14:
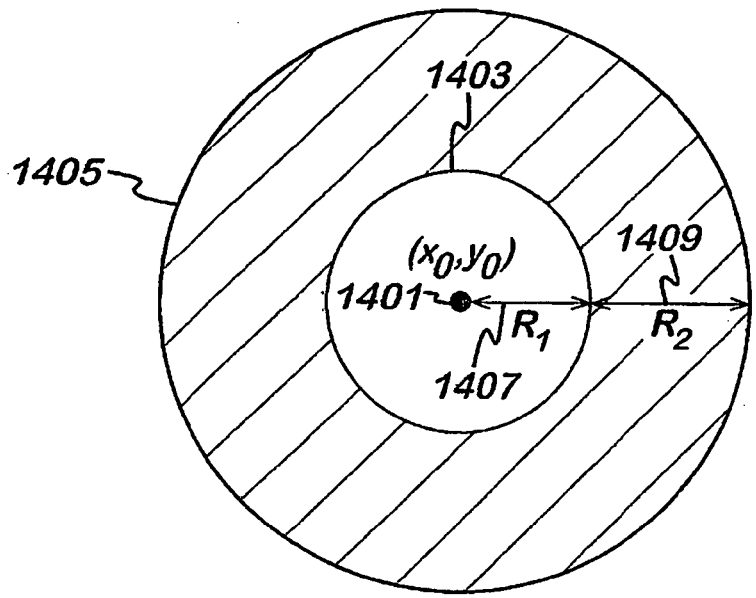
FIG. 14 shows the Circular crown confidence region for a location estimate produced from a constant TA value.

First it is helpful to define the parameters of the circular crown depicted in FIG. 14. FIG. 14 shows a constant timing advance (TA) region defined by the difference in area between two concentric circles with a common origin 1401. The first circle 1403 having a radius $R_1$ 1407 and the second circle 1405 having a radius $R_1 + R_2$.

The mathematical definition for the crown in the polar reference system is:

$$C: \{(\rho, \theta) \in IR^2 : R_{inf} \leq \rho \leq R_{sup}\} \quad (178)$$

Where $R_{inf}$ is inner radius and $R_{sup}$ is outer radius. In the example shown in FIG. 14 the first circle radius 1407 $R_1 = R_{inf}$, and the second circle radius $R_1 + R_2 = R_{sup}$.

This crown is therefore represented by a set of points:

$$S_{crown}: \{\rho_n, \delta_n\}; n = 1, \ldots, N_{crown} (N_{crown} \leq N_S). \quad (179)$$

9. To determine the back radius $(R_B)$ the following steps are followed:

(a) set i=0

(b) The number of points in the crown defined in equation (179) is calculated using $R_{inf} = i \cdot \Delta$ and $R_{sup} = (i+2) \cdot \Delta$, where $\Delta$ is the distance of digitized elements in x and y directions.

(c) If the serving area is omni-directional at the distance $R_{sup}$, there are approximately $N_{ideal} = \pi(R_{sup}^2 - R_{inf}^2)/\Delta^2$ points in the crown. If the actual number of points in $S_{crown}$, $N_{crown}$ is less than $\gamma' N_{ideal}$, the serving area is no longer considered to be omni-directional. The value of $\gamma' < 1.0$ and is based on experience a good value being 0.75. If the serving area is not considered to be omni-directional the back radius is chosen to be $R_B = R_{sup}$.

(d) If the serving area can be considered omni-directional at distance $R_{sup}$, set i=i+1 and go to (b), otherwise the estimate of Back radius is ready.

10. To determine the orientation, $\phi_s(d)$, the angles in the circular crown are sorted in order of either increasing or decreasing angle;

$$\{\rho_l, \delta_l\}_{l=1}^{N_{crown}} = \text{sort}\{\delta_l\}, \quad (180)$$

From the definition of the crown $R_{inf} = d - 2\Delta$ and $R_{sup} = d + 2\Delta$. The estimate for the $\phi_s(d)$ is therefore the median value of the angles and it is obtained as:

$$\phi_S(d) = \delta_{l|l=\lceil N_{crown}/2 \rceil}. \quad (181)$$

11. The Angular width as a function of distance from serving BTS, $\Delta\phi_s(d)$ is calculated using the same sorted set of points in the circular crown as is used for $\phi_s(d)$. Angular width, $\Delta\phi_s(d)$, is calculated as follows:

$$\Delta\phi_S(d) = \max\{\|\delta_1 - \phi_S(d)\|, \|\delta_{N_{crown}} - \phi_S(d)\|\}. \quad (182)$$

12. As the last step it is necessary to rotate $\phi_s(d)$ and $\Delta\phi_s(d)$ back to the original co-ordinate reference system. This is done by simply adding $\theta_R$ to the obtained values.

Where coverage maps are not available, it is possible to analytically estimate the cell front radius, $R_F$, and cell back radius, $R_B$, with the method presented below.

As described earlier, such as by equation (33), the average received power, $P_R$, by a mobile device a distance, d, from the serving BTS can be expressed as:

$$P_R(d) = P_T + G' - PL(d) \quad (183)$$

The BTS transmits a known transmitted power $P_T$ and the gain of the antenna installed at the serving BTS in the direction of the MS is G. PL(d) is the path-loss affecting the signal power as it propagates from serving BTS to MS. The accepted model, such as those used in equations (126) to (129) above, assumes the path-loss increases logarithmically with the distance d:

$$PL(d) = A + B \log d \qquad (184)$$

The sector front radius can be defined as the distance at which the average power received by a MS, $P_R$, is above a certain threshold defining the cell edges, $P_R^{th}$. The effect of potential shadow fading is allowed for by including a shadow fade margin $FM_\sigma$ (all quantities are in logarithmic units)

$$P_R = P_R^{th} + FM_\sigma \qquad (185)$$

Under the assumption of log-normal slow fading, the fade margin can be defined as $FM_\sigma = z\sigma$, where $\sigma$ is the standard deviation of the slow fading and z is such that $$F(z) = 1 - Q(z) = 1 - \frac{1}{\sqrt{2\pi}} \int_z^\infty e^{-x^2/2} dx \qquad$$

is the radius estimate's reliability.

According to equations (183) and (185) the front cell radius in kilometres can be then expressed as $$R_F = 10^{\frac{F_T - F_R^{th} - FM_\sigma + G_m - A}{B}} \qquad (186)$$

where $G_m$ is the maximum antenna gain in dB.

Figure 5:
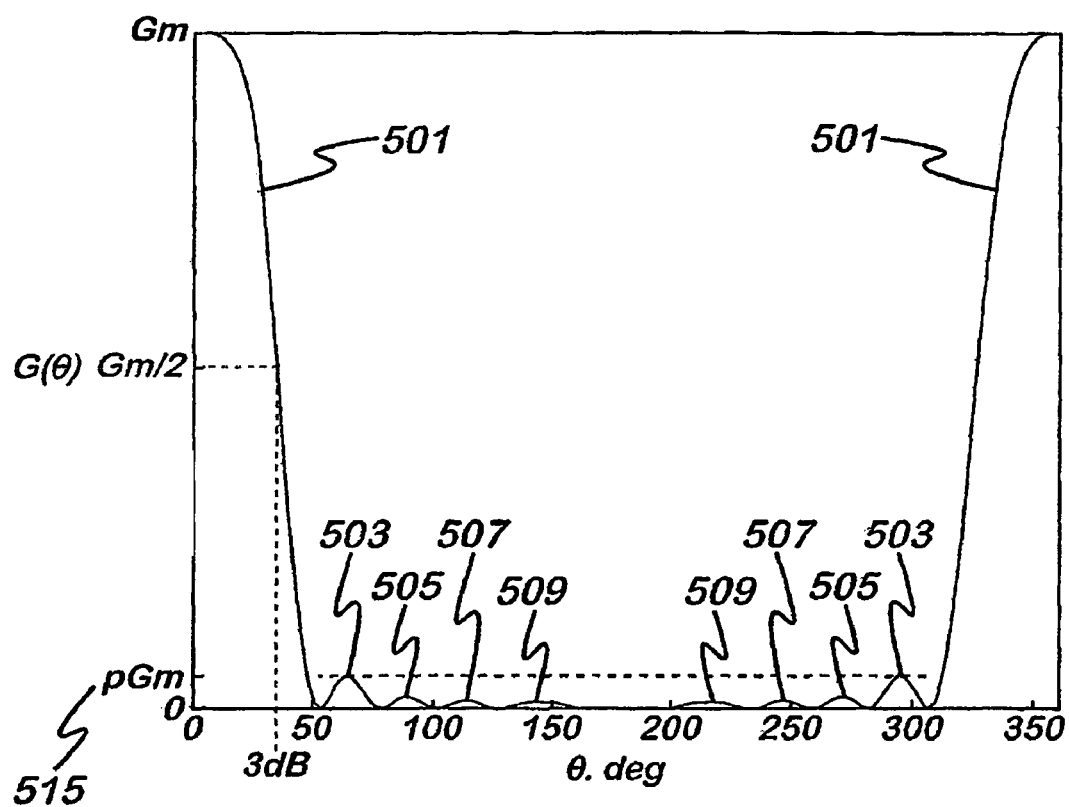
FIG. 5 shows another example of antenna gain in a transceiver as shown in FIG. 4.
Figure 6:
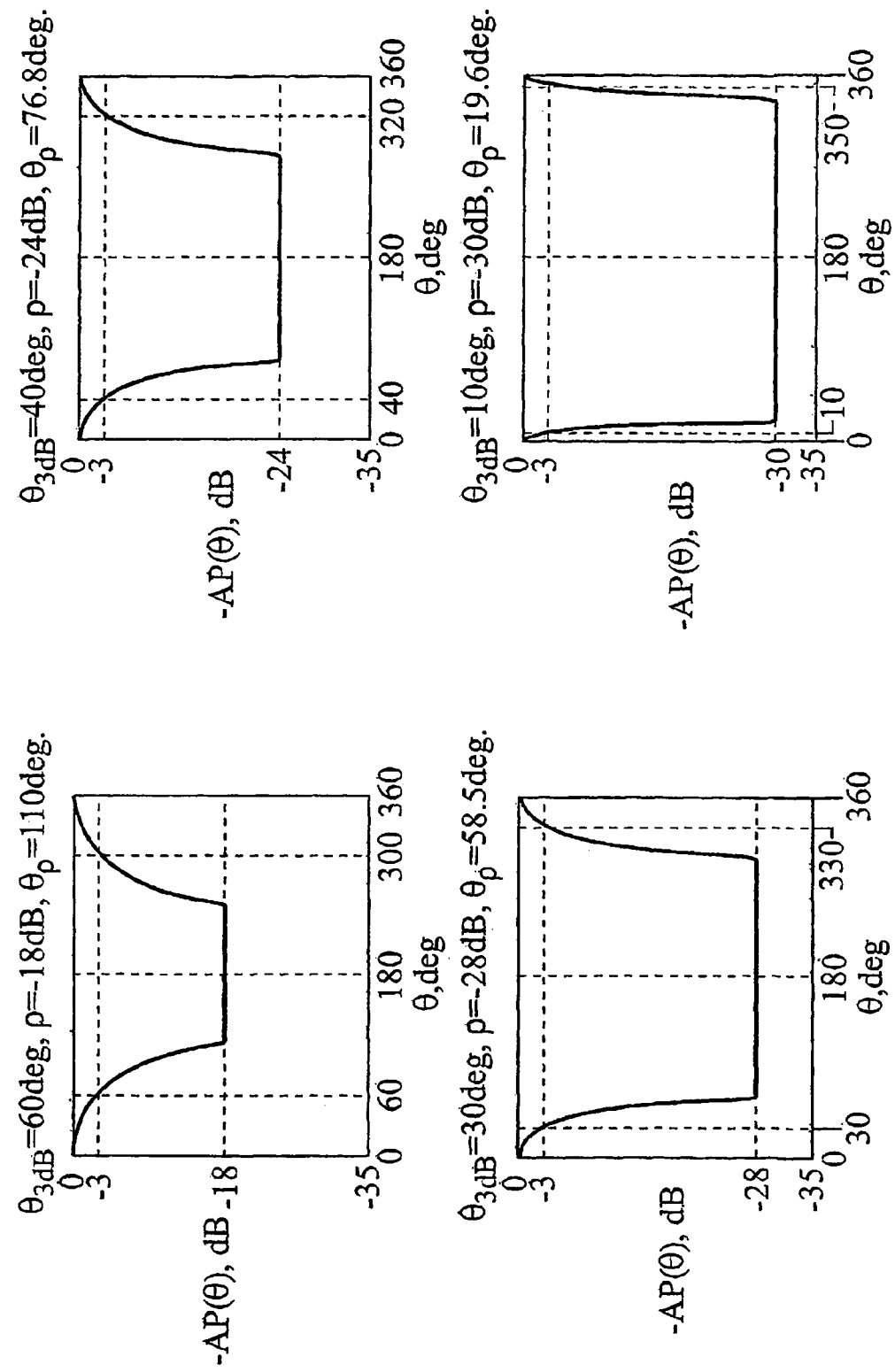
FIG. 6 shows approximated radiation patterns as found in transceivers as shown in FIG. 1.
Figure 7:
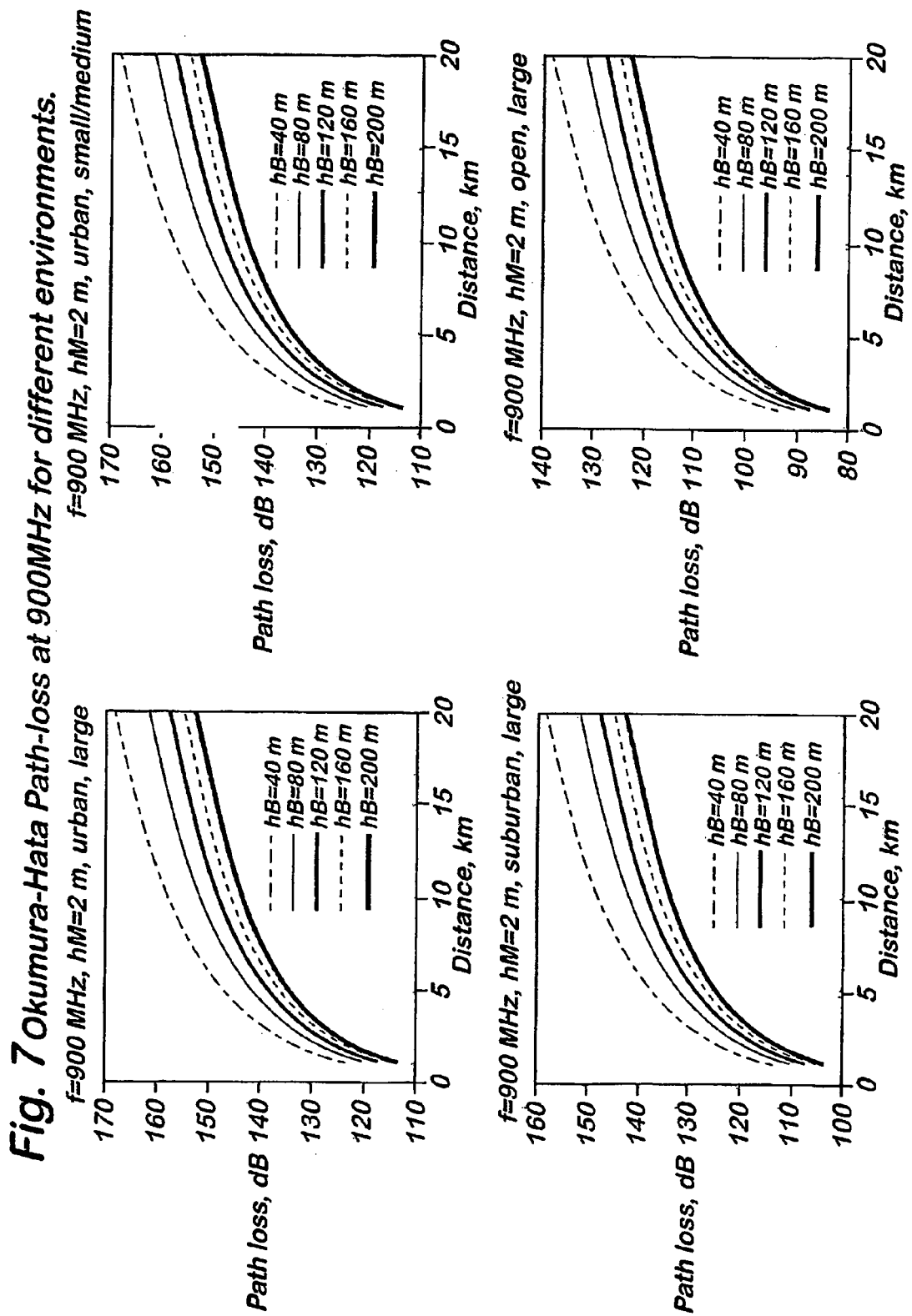
FIG. 7 shows the Okumura-Hata path loss graphs for modelled wireless cellular networks as shown in FIG. 1.

The sector back radius can be calculated from the front radius by including information on the radiation pattern of the antenna installed at the serving BTS site. FIG. 5 shows an annotated version of FIG. 4, a plot of antenna gain in decibels against angle measured in degrees. The antenna gain, symmetrical about the angle $\theta=0$, comprises a main lobe 501, and four side lobes 503, 505, 507, 509. The main lobe 501 has a maximum value of $G_m$ at $\theta=0$, whilst none of the side lobes 503, 505, 507, 509 have gains greater than $\rho G_m$. $\rho$ is the maximum Back-to-Front Ratio, that is the maximum ratio between the antenna gain in the direction of maximum radiation, $G_m$ and the gain of the antenna in the directions outside of the main lobe. It is evident that the cell front radius, $R_F$, is related to the maximum gain in the main lobe directions, $G_m$, and the cell back radius, $R_B$, is related to the maximum gain in the directions outside of the main lobe $\rho G_m$.

By using the simple propagation model (183) and the following rough approximation of the antenna gain $G(\theta)$ in dB ($G_m = 10 \log(g_m)$)

$$G(\theta) \simeq \begin{cases} G_m; & 0 \le \theta < \theta_{3dB} \\ G_m + 10\log(\rho); & \theta_{3dB} \le \theta \le 2\pi - \theta_{3dB} \\ G_m; & 2\pi - \theta_{3dB} < \theta \le 2\pi \end{cases} \qquad (187)$$

it is possible to write the following upper limit for $R_B$:

$$R_B \le \rho \times R_F \qquad (188)$$

Typical values used in GSM900 are $P_T = 50$ dBm, $P_R^{th} = -95$ dBm. For a BTS height of 30 meters, typical values for variables are A=124.5 and B=35.7. In the mobile radio environment, $\sigma$ is often assumed equal to 8 dB. For this example the BTS antenna has HPBW 65 degrees, Back-to-Front Ratio −18 dB ($\rho$=0.0158) and maximum gain 12 dB. With these values and for z=0.675 (i.e., F(z)=0.75 equivalent to 75% cell radius reliability) formulas (186) and (188) give $R_F$=5.7425 kilometres and $R_B \cong 90$ meters.

From the examples shown, it is evident that the representation of the sector as shown in FIG. 10 might approximate poorly the real cell coverage. In particular, $\Delta\phi_s$ is usually too large to represent the sector width in those regions far away from the BTS coordinates. To improve this inaccuracy in estimation, it is possible to define the serving sector width as a function of the distance from the serving BTS, $\Delta\phi_s(d)$. By taking this into account it is possible to neglect in the location algorithm those regions which clearly lie outside of the serving area. The same applies for the sector direction, $\phi_s$, which can be assumed to be a function of the distance from the BTS site, $\phi_s(d)$.

$R_F$, $R_B$, $\phi_s$ and $\phi_s(d)$ (eventually dependent on the distance, d) create a analytical estimation of the simplified borders of the serving cell as follows:

$$S(x,y): \begin{cases} d(x,y) = R_F; & 0 \le |\psi(x,y) - \phi_S| \le \Delta\phi_S \\ d(x,y) = R_B; & |\psi(x,y) - \phi_S| > \Delta\phi_S \end{cases} \qquad (189)$$

In embodiments of the present invention the above estimations of the generalised cell parameters are used to estimate the location of the mobile device (MS). The algorithm used in embodiments of the present invention is referred to as a Classic CI-TA Location Algorithm, as opposed to a Map-Aided CI-TA Location Algorithm.

As explained previously the input parameters to the algorithm used in embodiments of the present invention are CI, TA (if available) and confidence coefficient of the location estimate, $\xi$. As also explained previously the output of the calculation is a location estimate and a confidence region (e.g., a geographical region within which the real MS location is situated within a degree of confidence $\xi$). The result of the location calculation differs if the cell is sectorized or omnidirectional.

Embodiments of the present invention described below are capable of providing these results when both CI and TA are available, further embodiments also described below provide results when only CI is available.

If the serving cell is sectorized, the location estimate is calculated by combining the serving BTS coordinates, $x_s$ and $y_s$, with an estimate of the MS-to-serving BTS distance, $\hat{d}$, and an estimate of the angular coordinate of the MS from the serving BTS site, $\hat{\psi}$:

$$\begin{cases} \hat{x} = x_S + \hat{d}\cos\hat{\psi} \\ \hat{y} = y_S + \hat{d}\sin\hat{\psi} \end{cases} \qquad (190)$$

$\hat{d}$ and $\hat{\psi}$ are the estimated distance and angle respectively as described below.

Given the TA information, the method described previously can be used to determine an estimate of the distance between MS and serving BTS and the radii of a circular crown (C) centred at the BTS coordinates where the mobile station can be located with a confidence $\gamma$.

The distance estimate, $\hat{d}$, is calculated as the 50-th percentile (or median value) of the real distance, d, i.e. $\hat{d}$ is such that $$Pr(d \le \hat{d}) = \frac{1}{2} \qquad (191)$$

Other analogous definitions for d̂, such as the mean of d, are possible. Using the results described in European Patent Application number 102251 which is hereby incorporated by reference, the median estimated distance is:

$$\hat{d} = d_{TA} + TA_c; \quad TA_c = -X_{1/2} \quad (192)$$

where $X_{1/2}$ is the median value of the TA measurement error, $X = d_{TA} - d$, and $$d_{TA} = \begin{cases} \frac{1}{4} \times (cT_b/2) \simeq 138m & \text{if } TA = 0 \\ TA \times (cT_b/2) & \text{if } TA > 0 \end{cases} \quad (193)$$

$T_b = 3.69$ μs is the bit period and $c = 3 \times 10^8$ m/s is the speed of light.

In absence of any other information, the angular coordinate of the MS can be estimated with the orientation of the sector, i.e. $\hat{\psi}$ can be set equal to $\phi_s$.

If the sector orientation is a function of the distance from the serving BTS, then $\hat{\psi}$ is the sector orientation at a distance equal to the one estimated on the basis of the TA, i.e. $\hat{\psi} = \phi_s(\hat{d})$.

Further means for estimating the MS angular coordinate can be incorporated into the algorithm found in embodiments of the present invention; for example, $\hat{\psi}$ can in further embodiments of the invention be determined by processing signal level measurements (RXLEVs) performed by the MS or, in the future, by using the angle-of-arrival information made available by (smart) antenna arrays installed at the serving BTS site.

Associated to the estimated MS location is the confidence region R as shown in FIG. 8 and comprising the following parameters: origin located at point with coordinates $(x_0, y_0)$; inner radius, $R_1$; uncertainty radius, $R_2$; orientation angle measured counter-clockwise from x axis, α, and inclusion angle defining the width of the sector, β.

Analogously to the distance estimate, the confidence region can be determined by using the method described in European Patent Application number 102251 which is hereby incorporated by reference.

The origin of the confidence region is at the serving BTS site:

$$\begin{cases} x_0 = x_S \\ y_0 = y_S \end{cases} \quad (194)$$

Given the measured TA and the confidence coefficient for the distance estimate γ, the confidence interval of the distance estimate (d̂) can be determined from the statistical properties of the TA measurement provided by the known map aided CI-TA estimation technique. The confidence interval for the distance estimate is determined by $r_i$ and $r_s$ defined as $$\begin{cases} r_i = TA_c + X_{(1+\gamma)/2} \\ r_s = -TA_c - X_{(1-\gamma)/2} \end{cases} \quad (195)$$

where $X_{(1\pm\gamma)/2}$ is the 100 $1\pm\gamma/2$% percentile of the TA measurement error. $r_i$ and $r_s$ are such that the true MS-serving BTS distance, d, falls within the confidence interval [d̂$-r_i$, d̂$+r_s$] with a probability, γ as shown in FIG. 15):

$$Pr(\hat{d} - r_i \le d \le \hat{d} + r_s) = \gamma \quad (196)$$

Figure 15:
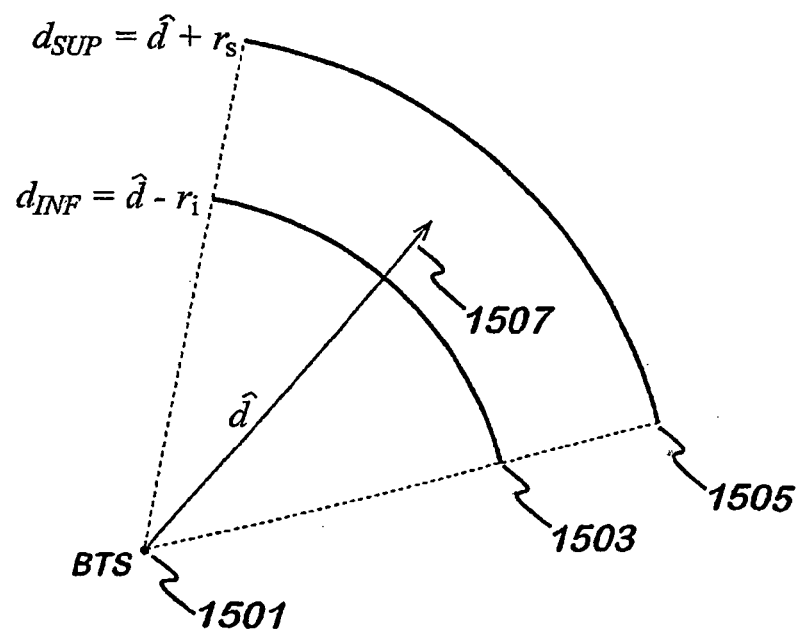
FIG. 15 shows a further geometric view of the confidence region for a location estimate as shown in FIG. 14.

FIG. 15 shows a base transceiver station (BTS) 1501, a location estimate d̂ 1507 which lies within the area defined by two arcs 1503, 1505. The larger arc has a radius $d_{sup}$, the smaller arc has a radius $d_{inf}$.

In embodiments of the present invention the confidence region parameters ($R_1$, $R_2$, α, and β) are calculated slightly differently depending if the serving cell back radius ($R_B$) is smaller or larger than the lower limit of the confidence interval for the distance estimate, $d_{INF} = \hat{d} - r_i$.

The cell back radius $R_B$ is not strictly needed, but provides enough information to improve the reliability of the method. Therefore in further embodiments of the present invention the value of the back radius $R_B$ is set to zero.

If $d_{INF}$ is larger than the serving cell back radius, $R_B$, the MS is sufficiently far away from the serving BTS and is probably located outside of the back radius region. In this case, only the portion of cell in the direction of main radiation lobe of the serving BTS antenna is included in the confidence region.

The inner radius of the confidence region is set to $R_1 = \hat{d} - r_i$. However $R_1 = \hat{d} - r_i = d_{TA} - X_{(1+\gamma)/2}$ can be negative (i.e., if γ≈1 and the TA error statistics have long tails $X_{(1+\gamma)/2}$ can be larger than $d_{TA}$), and if $R_1$ is calculated to be negative, $R_1$ should be set to zero. Moreover, when TA=0 it is sensible to define the confidence region as a circle centred on the serving BTS coordinates; in which case $R_1$ is set to zero. In summary, $R_1$ is defined as follows:

$$R_1 = \begin{cases} 0 & \text{if } TA = 0 \\ \max\{0, \hat{d} - r_i\} & \text{if } TA > 0 \end{cases} \quad (197)$$

The uncertainty radius of the confidence region ($R_2$) is set equal to the width of the confidence interval of the distance estimate, $r_i + r_s$. However, as a consequence of the adjustments made in (197) to determine $R_1$, the correct definition for $R_2$ is $$R_2 = \hat{d} + r_s - R_1. \quad (198)$$

The orientation angle of the confidence region (α) is determined by the orientation of the serving sector and the sector angular width. The width of the confidence region β is twice the serving sector width:

$$\begin{cases} \alpha = \phi_S(\hat{d}) - \overline{\Delta\phi_S} \\ \beta = 2\overline{\Delta\phi_S} \end{cases} \quad (199)$$

where $\overline{\Delta\phi_s}$ is defined to take into account conservatively the eventual dependence of the cell width on the distance from the serving BTS, d:

$$\overline{\Delta\phi_S} = \max_{R_1 \le d \le R_1 + R_2} \Delta\phi_s(d) \quad (200)$$

The confidence region has an angular width equal to twice the angular width of the serving cell. The sectorization of the cell is therefore taken into account. The underlying reason for this is the assumption that all the mobile devices in communication with the BTS of interest are located in an arc defined angularly $-\Delta\phi_s \le \psi(x,y) - \phi_s(\hat{d}) \le \Delta\phi_s$ (with an exception covered by equation (189) when $R_B = 0$). This also produces the result that the confidence coefficient used to determine the circular crown, γ, is equal to the confidence coefficient ξ used to define distances $R_1$ and $R_2$.

If $d_{INF}$ is smaller than the serving cell back radius, $R_B$, there is a large probability that the actual location of the MS lies in the back radius region. In this case the location estimate is calculated as previously but the confidence region is defined in such a way to include the whole back radius region. This means that the width of the confidence region β is $2\pi$ and the orientation angle α provides redundant information as the confidence arc is defined as the whole circle (α is set to zero). Furthermore, the inner and the uncertainty radii are given as follows:

$$\begin{cases} R_1 = 0 \\ R_2 = \hat{d} + r_s. \end{cases} \quad (201)$$

In practical terms, the definitions above simply state that when the MS is very close to the serving BTS site, the effects of the back radius region are considered by treating the serving cell as if it was omni-directional.

If the serving cell is omni-directional the concepts of sector orientation and angular width are meaningless. The best location estimate is provided by using the co-ordinates given by the serving BTS site:

$$\begin{cases} \hat{x} = x_S \\ \hat{y} = y_S \end{cases} \quad (202)$$

where the confidence region is defined by a circle with radius equal to the upper limit of the confidence interval of the distance estimate:

$$\begin{cases} x_0 = x_S \\ y_0 = y_S \end{cases}; \begin{cases} \alpha = \text{Any value} \\ \beta = 2\pi \end{cases}; \begin{cases} R_1 = 0 \\ R_2 = \hat{d} + r_s \end{cases} \quad (203)$$

$\hat{d}$ and $r_s$ are calculated as in the case of sectorized cell using equations (192) and (195).

The calculations described above make use of statistical information from the TA measurement error. If the TA measurement error statistical information is not available, the definitions for location estimate and confidence region given above still apply; however the confidence coefficient is meaningless and $\hat{d}$, $r_i$ and $r_s$ can be defined only on the basis of the TA quantization rule:

$$\hat{d} = d_{TA} \quad (204)$$

$$r_i = r_s = \begin{cases} \frac{1}{4} \times (cT_b/2) \cong 138m \text{ if } TA = 0 \\ \frac{1}{2} \times (cT_b/2) \cong 277m \text{ if } TA > 0 \end{cases}$$

The algorithm presented above estimates the MS coordinates and the confidence region when both CI and TA are available. If no TA information is available, the MS location estimate and its confidence region can still be determined by using the information carried by the CI only. In particular, the confidence region can be defined if an estimate on the cell radius, $R_F$ is available while the location estimate can be provided even if $R_F$ is not known.

Where there is no TA information available, embodiments of the present invention examine the serving BTS to determine whether the serving cell is sectorized or not:

If the cell is omnidirectional and the TA is not available the location estimate is according to embodiments of the invention taken to be at the BTS coordinates:

$$\begin{cases} \hat{x} = x_S \\ \hat{y} = y_S \end{cases} \quad (205)$$

The confidence region of this estimate is a circle centred on the BTS site. The radius of such region is obtained by scaling $R_F$ by a factor $\sqrt{\xi}$. The factor is chosen in order that a fraction $\xi$ of the total area of the circular cell of radius $R_F$ is included in the confidence region:

$$\begin{cases} x_0 = x_S; & y_0 = y_S \\ \alpha = \text{Any value;} & \beta = 2\pi \\ R_1 = 0; & R_2 = \sqrt{\xi} R_F \end{cases} \quad (206)$$

If the cell is sectorized and the TA is not available, two alternatives exist for the location estimate.

The first alternate as used in embodiments of the invention select the MS location estimate to be at the serving BTS site. In this estimate no cell radius ($R_F$) information is needed.

$$\begin{cases} \hat{x} = x_S \\ \hat{y} = y_S \end{cases} \quad (207)$$

If the $R_F$ is given, embodiments of the present invention calculate the estimated MS location as the mass centre of a simplified cell with the same shape as represented in FIG. 10 but with the back radius and the front radius scaled by a factor $\sqrt{\xi}$, to assure that only a fraction $\xi$ of the total area of the original cell is considered.

The coordinates of the serving cell's mass centre are defined as follows:

$$x_{MC} = \frac{1}{M(S)} \int_S x\,dx\,dy; \quad y_{MC} = \frac{1}{M(S)} \int_S y\,dx\,dy \quad (208)$$

where S is the border of the home cell, as explained in equation (189), and M(S) its area. By neglecting the dependence of the sector orientation and width on the distance and assuming a constant sector's angular width $\overline{\Delta\phi_s}$ defined as $$\overline{\Delta\phi_s} = \max_{R_B \le d \le R_F} \Delta\phi_s(d) \quad (209)$$

it can be shown that $M(S) = R_F^2 \overline{\Delta\phi_s} - (\pi - \overline{\Delta\phi_s})R_B^2$ and the integrals in (208) solved in polar coordinates give the following expressions for the location estimate $\hat{x} = x_{mc}$ and $\hat{y} = y_{mc}$ $$\begin{cases} \hat{x} = x_S + \frac{2}{3} \frac{(R_F^3 - R_B^3)\sin\overline{\Delta\phi_s}}{R_F^2 \overline{\Delta\phi_s} - (\pi - \overline{\Delta\phi_s})R_B^2} \cos\phi_S \\ \hat{y} = y_S + \frac{2}{3} \frac{(R_F^3 - R_B^3)\sin\overline{\Delta\phi_s}}{R_F^2 \overline{\Delta\phi_s} - (\pi - \overline{\Delta\phi_s})R_B^2} \sin\phi_S \end{cases} \quad (210)$$

The confidence region has the same shape as shown in FIG. 8, with the inner radius equal to zero ($R_1=0$). The origin of the confidence region ($x_o, y_o$) is not at the BTS coordinates ($x_s, y_s$) but is shifted along the axis defined by the sector orientation $\phi_s$ (in the direction opposite to the front side of the cell) by a distance $R_s'$ from the BTS coordinates. By using this definition of the confidence region, the back radius region is included (at least partially). The angular width of the confidence region, $\beta$, is defined as twice the angle $\Delta\phi_s' \neq \Delta\phi_s$, which is calculated in light of the different location of confidence region's origin and serving BTS coordinates. The confidence region's orientation, $\alpha$, is defined according to the cell orientation, $\phi_s$, and the new variable $\Delta\phi_s'$:

$$\begin{cases} x_0 = x_S - R_B'\cos\phi_S; & y_0 = y_S - R_B'\sin\phi_S \\ \alpha = \phi_S - \Delta\phi_S'; & \beta = 2\Delta\phi_S' \\ R_1 = 0; & R_2 = \sqrt{\xi}\,(R_F + R_B') \end{cases} \quad (211)$$

Figure 16:
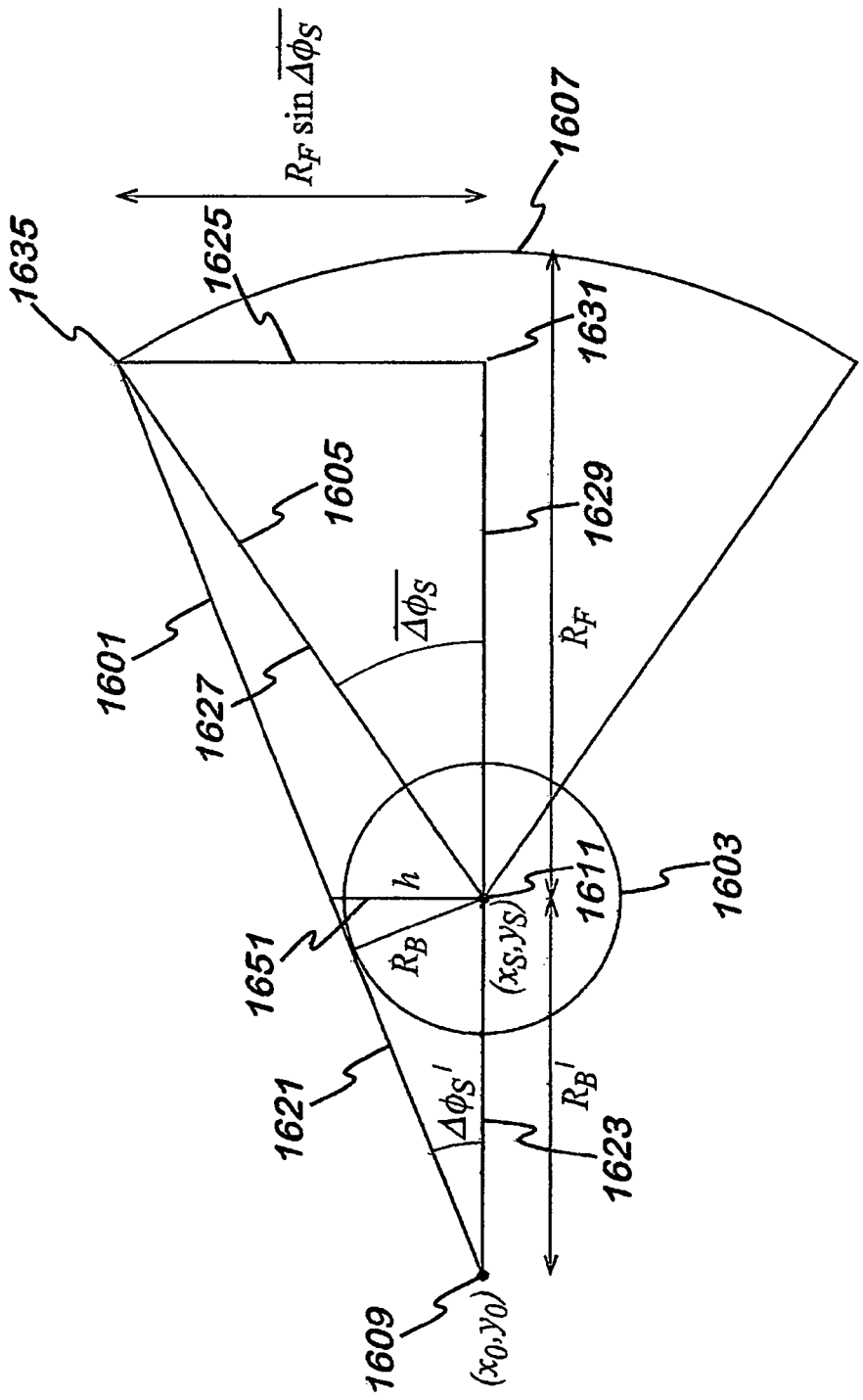
FIG. 16 shows the geometry used to calculate the confidence region in a CI location estimate.

$R_B'$ and $\Delta\phi_s'$ are determined from the geometry as shown in illustrated in FIG. 16.

FIG. 16 shows the geometry used in embodiments of the present invention for calculating the confidence region. The figure comprises a circle 1603, a first triangle 1601, a second triangle 1605, and a circular segment 1607. The circle has an origin, 1611, at the BTS location, $x_s, y_s$, and has a radius $R_B$. The first comprises a first vertex 1609 at location $x_0, y_0$, a first side 1623, connected at one end to the first vertex, 1609 which passes the origin of the circle, $x_s, y_s$, a second side 1621, connected at one end to the first vertex and arranged so that the angle at the first vertex 1609 defined by the two sides 1623, 1621 is $\Delta\phi_s'$. The vertex 1609 of the first triangle is located a distance $R_B'$ from the origin of the circle. The second triangle 1605 lies within the area of the first triangle 1601, and comprises a first vertex located at the origin of the circle, a first side 1629 connected at one end to the second triangle's first vertex and forming part of the first triangle's first side, and a second side 1627 connected at one end to the first vertex and arranged to have an angle between the first side 1629 and the second side 1627 of $\overline{\Delta\phi_s}$. Both the first triangle 1601 and the second triangle 1605, also comprise a common right angle vertex 1631, and a common side 1625. The common side being arranged as the line perpendicular to both triangles' first sides and connected to the point where the first and second triangle's sides intersect 1635. The segment 1607 comprises two radii of length $R_f$ with an origin at the origin of the circle 1603, $x_s, y_s$, and an arc defined between the ends of the radii. The first radius is common to the second triangle's second side 1605, and the second radius is an angle $2\overline{\Delta\phi_s}$ from the first. Using simple trigonometry, the height of the first and second triangle's second side can therefore be shown to be equal to $R_F \sin(\overline{\Delta\phi_s})$. FIG. 16 further has a line 1651 connected to and perpendicular to the first triangle's first side 1623 at the circle's origin 1611, and a second end at the intersection of the line and the first triangle's second side. The line 1651 has a length h.

Depending on whether $\overline{\Delta\phi_s}$ is larger or smaller than $\pi/2$, embodiments of the present invention determine $R_B'$ and $\Delta\phi_s'$ as explained below.

If $R_F \gg R_B$ and $\overline{\Delta\phi_s} > \pi/2$, it can be seen that only a very small area of the circle defined by $R_B$ is left out of the confidence region if $R_B'$ is defined as being equal to $R_B$:

$$R_B' = R_B. \quad (212)$$

Using this definition for $R_B'$ the analytical expression for $\Delta\phi_s'$ is calculated from the geometry shown in FIG. 16. The result is:

$$\Delta\phi_S' = \pi - \cos^{-1}\left[\frac{R_F\cos(\pi - \overline{\Delta\phi_S}) - R_B'}{\sqrt{(R_F\cos(\pi - \overline{\Delta\phi_S}) - R_B')^2 - R_F^2\sin^2(\pi - \overline{\Delta\phi_S})}}\right]. \quad (213)$$

Using the geometry shown in FIG. 16 $\Delta\phi_s'$ is obtained as follows:

$$\Delta\phi_S' = \tan^{-1}\left[\frac{R_F\sin(\overline{\Delta\phi_S}) - h}{R_F\cos(\overline{\Delta\phi_S})}\right] \quad (214)$$

and using this result $R_B'$ is easy to calculate as follows:

$$R_B' = \frac{h}{\tan(\overline{\Delta\phi_S'})} \quad (215)$$

The length h can be approximated as $h \approx R_B$. This approximation is only performed after checking that the confidence region is too small and does not include a large enough part of the circle with radius of $R_B$ (i.e. the value of $R_B'$ is too small) or conversely that $R_B'$ is too large leading to a too large confidence region. To check for these cases two chosen parameters are introduced: $\delta_{min}$ (taking care of the too small $R_B'$ example—where 1.5 is a typical choice for $\delta_{min}$) and $\delta_{max}$ (taking care of the too large $R_B'$ example—there 4-5 is a typical choice for $\delta_{max}$).

If $R_B'$ turns out to be too small, i.e. if $\delta_{min}R_B > R_B'$, then $R_B'$ is re-defined in embodiments of the invention as $$R_B' = \delta_{min}R_B \quad (216)$$

and $\Delta\phi_s'$ is obtained using the geometry as shown in FIG. 16:

$$\Delta\phi_S' = \tan^{-1}\left[\frac{R_F\sin(\overline{\Delta\phi_S})}{R_F\cos(\overline{\Delta\phi_S}) + R_B'}\right] \quad (217)$$

If $R_B'$ turns out to be too large, i.e. if $\delta_{max}R_B > R_B'$ then $R_B'$ is re-defined as $$R_B' = \delta_{max}R_B \quad (218)$$

and $_s$ is calculated from equation (217).

Figure 17:
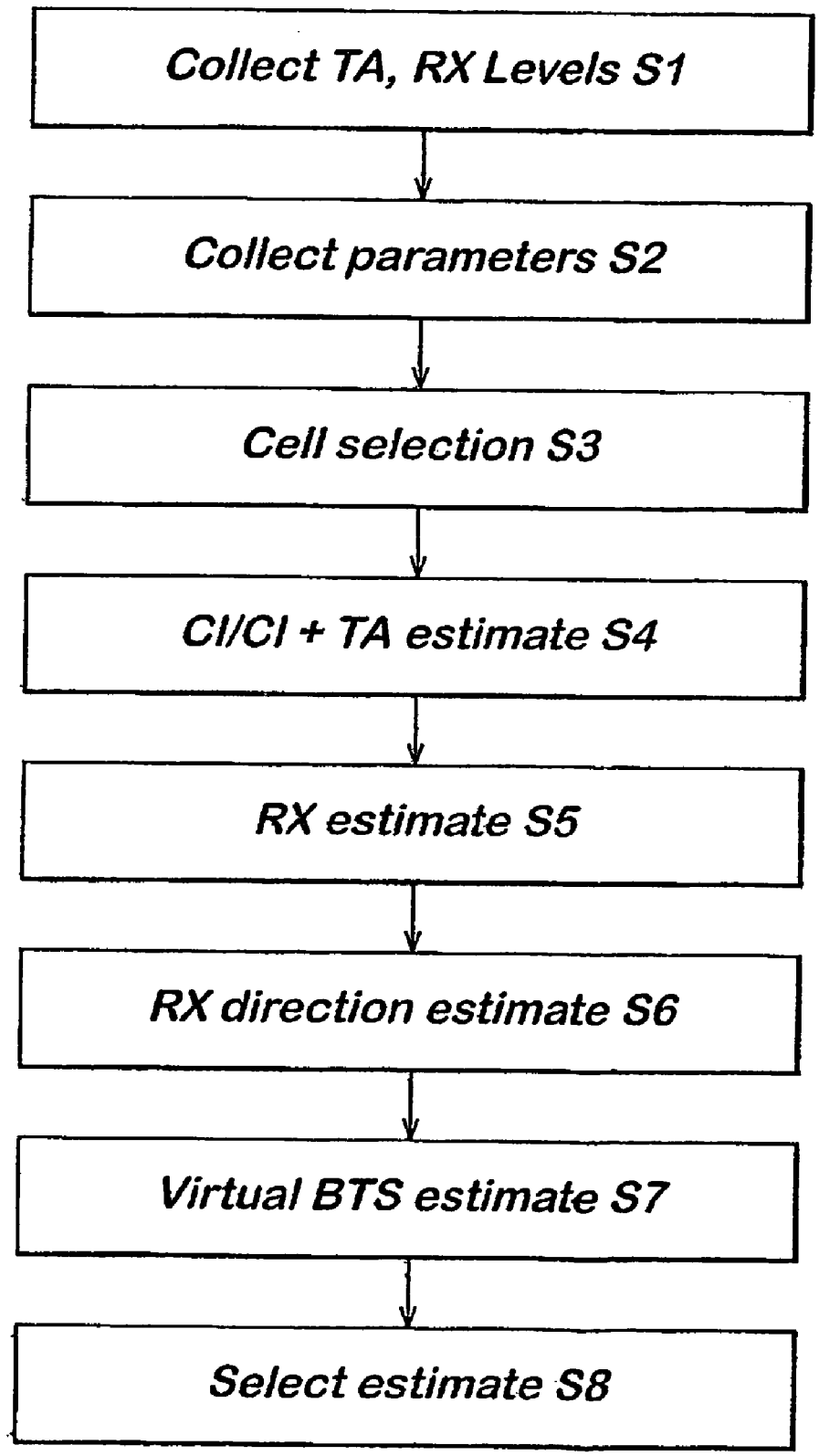
FIG. 17 shows a flow diagram detailing the steps to provide location estimates in embodiments of the invention.

The proposed location procedure incorporating at least some of the location methods utilizing CI,TA or and RX information is shown in FIG. 17. The procedure can incorporate location methods presented above (CI, CI+TA and CI+RX algorithms). The process of which is described as follows: Firstly, in step S1 the timing advance and received signal levels measured by the mobile station from the serving and neighbour cells are collected.

Next, the relevant algorithm input parameters and radio network parameters such as the base transceiver station coordinates for the measured cells are collected in step S2.

In step S3, the measurements and the network data are analysed to select which measurements have to be used in the location calculation. Cells that do not contribute significantly to improving the location accuracy are removed from the measurement set. As a result of the cell selection procedure, serving cell information can potentially be removed and/or neighbour cell information can possibly be totally or partially removed.

In step S4, a cell identity/cell identity plus timing advance location estimate is made. If serving cell information is available, cell identity or cell identity and timing advance based location algorithms such as described hereinbefore can be used to determine a location estimate and/or a confidence region for it. The resulting location estimate is called in this document, the "CI/CI+TA Location Estimate".

In step S5, an RX location estimate is made. If the neighbour cell information is available, a CI+RX based location algorithm is applied. This may be any one of algorithms A to F described hereinbefore or indeed any other suitable algorithm. This is used to estimate the mobile station location. In selecting the CI+RX based algorithms, the following criteria may be taken into account:

cell sectorisation. For omnidirectional cells, CI+RX based algorithms can be used. For example, algorithms D (equation 154), E (equation 156) or F (equation 158) may be used.

For sector cell cells, CI+RX based algorithms such as algorithms A, B and C described hereinbefore can be used directly. Alternatively, algorithms D, E and F can be extended to the case of sector cells as described previously.

Absolute/relative level observations

Algorithm C described hereinbefore makes use of relative level observations, that is the difference in received signal level measurements from pairs of base transceiver stations. It should be appreciated that algorithms A, B, D, E and F use absolute level observations.

Closed form/iterative algorithms

Algorithms A, B, C, D and E are iterative algorithms. Algorithm F is a closed form algorithm. It determines the mobile station coordinates as a weighted average of the coordinates of the base transceiver stations from which the received signal level measurements have been collected. One analytical expression (equations 163 and 164) and three empirical approximations for the weights are also provided as discussed above RX-based domain determination The RX-based algorithms may require determination of the "domain" in which the RX-based location estimated is constrained to lie. Such a domain can be defined using, for example, any of the definitions provided hereinbefore.

The obtained location estimate is called for convenience "RX location estimate".

In step S6 an RX direction location estimate is obtained. If serving cell information and the "RX location estimate" are available, the direction from the serving base transceiver station to the "RX location estimate" is calculated. This direction is used, instead of the actual antenna direction, as an input for a CI+TA based algorithm, as explained above. The resulting location estimate is called, for convenience, "RX direction location estimate".

In step S7, a virtual BTS location estimate is calculated.

If serving cell information and "RX-direction location estimate" are available, the coordinates of the "RX-direction location estimate" is used as an additional (omni-directional) neighbour cell for the RX based algorithm. This additional neighbour cell and the RX level measurement associated with it can be called the "virtual base transceiver station" and "virtual RX level" respectively. The value for the virtual RX level measurement can be selected for example as the maximum RX level from the measured neighbours or as the average RX level from the measured neighbours. The resulting location estimate is called "the virtual BTS location estimate".

It should be appreciated that a location estimate obtained by any of the location methods discussed can be used as an additional or virtual base station measurement. The virtual base station measurement is associated with a virtual measurement, for example the virtual RX level, and the set of real measurements and the virtual measurement is reprocessed using any of the location methods described.

In step S8, any one of the obtained location estimates: CI/CI+TA location estimate; RX location estimate; RX-direction location estimate; RX location estimate; RX-direction location estimate; or virtual BTS location estimate can be selected as the location estimate delivered by the location process.

Embodiments of the present invention are particularly flexible. For example, if the TA measurements and/or serving cell information are not available, the process is still able to provide location information—such as the RX location estimate. Likewise, if neighbour information and/or RX level measurements are not available, the process is still capable of delivering location estimates using the CI/CI+TA location estimate.

Embodiments of the present invention enable both the RX level and TA measurements to be used effectively. This information is currently provided in the standard GSM networks. The combined use of timing advance and RX level measurements "the virtual BTS location estimate" gives the most accurate location estimates in the regions of the highest density of the mobile users. In embodiments of the present invention, one of the estimates is selected. Where more than one estimate can be obtained, an averaging or alternatively a weighting of the results may be provided.

Where a number of different location estimates can be determined, only one of the methods may be used. Any suitable criteria can be used for determining which of the methods is to be used.

Whilst embodiments of the present invention have been described particularly in the context of an arrangement where a number of different location methods are used, it should be appreciated that in some embodiments different ones of the location algorithms described hereinbefore can be used alone.

The invention claimed is:

1. A method, comprising:
   collecting location information;
   selecting at least one of a plurality of different location methods to provide a location estimate said methods comprising using cell identity information;
   determining a first location estimate of a mobile device based on the at least one selected location method, said first location estimate being based on a serving base transceiver station;
   determining a virtual base station estimate using at least some of the collected location information, said virtual base station estimate being determined based on the first location estimate of the mobile device and direction information of the serving base transceiver station; and
   providing a second location estimate using one of said different location methods based on the first location estimate and the virtual base station estimate, said second location estimate being a location of the mobile device.

2. A method as claimed in claim 1, wherein said at least one location method comprises at least one of:
   using cell identity information;
   using cell identity information and received signal strength;
   using cell identity information and timing advance information; and
   using cell identity information, received signal strength information and timing advance information.

3. A method as claimed in claim 2, further comprising determining the virtual base station estimate, using at least one of the cell identity information, cell identity information and received signal strength, cell identity information and timing advance information, and using cell identity information, received signal strength information and timing advance information.

4. A method as claimed in claim 1, wherein said virtual base station location estimate is coupled with at least one virtual measurement and at least one real measurement, said at least one virtual measurement being processed using a location method.

5. A method as claimed in claim 2, wherein providing said second location estimate comprises processing said virtual base station location estimate is coupled with at least one virtual measurement and at least one real measurement, said at least one virtual measurement being processed using a location method, and wherein the at least one real and the at least one virtual measurements are processed using at least one of cell identity information, cell identity information and received signal strength, cell identity information and timing advance information, and using cell identity information, received signal strength information and timing advance information.

6. A method as claimed in claim 4, wherein a value for the virtual measurement is one of measured levels, a combination of measured levels, and an average of measured levels.

7. A method as claimed in claim 1, wherein said at least one location method is selected in dependence on the location information available.

8. A method as claimed in claim 1, wherein a plurality of location estimates are determined and at least one estimate is used to provide said location estimate.

9. A method as claimed in claim 1, wherein said location information is collected by said mobile device.

10. A method as claimed in claim 9, wherein said mobile device is configured to measure a level of at least one type of information.

11. A method as claimed in claim 1, wherein said location information comprises at least one of timing advance information and received signal level.

12. A method as claimed in claim 11, wherein said received signal level is an absolute received signal level or relative received signal level.

13. A method as claimed in claim 1, wherein said mobile device is in a cellular communications device.

14. A method as claimed in claim 13, wherein said information is collected for a serving cell of the mobile device.

15. A method as claimed in claim 13, wherein said information is collected for at least one neighbouring cell.

16. A method as claimed in claim 13, further comprising selecting the or each cell in respect of which location information is collected.

17. A method, comprising:
collecting location information;
selecting at least one of a plurality of different location methods to provide a location estimate said methods comprising using cell identity information;
providing a location estimate of the mobile device based on the at least one selected location methods,
wherein the location estimate is provided using the following algorithm
calculate the total attenuation experienced by a signal transmitted by the i-th BTS while propagating toward a mobile station where i-th level observation is $L^i$) by subtracting from the i-th measured received power, $P^i_r$, the maximum power radiated by the i-th BTS, $P^i_{t,max}$:

$$L^i = P^i_r - P^i_{t,max}; i=1,\ldots,N$$

stack the level observations from N BTS's in vector L:

$$L=[L^1,\ldots,L^N]^T$$

solve the minimization problem:

$$\begin{bmatrix} \hat{\sigma}_u^2 \\ \hat{x} \\ \hat{y} \end{bmatrix} = \arg\min_{\begin{bmatrix} \sigma_u^2 \\ x \\ y \end{bmatrix}} F(x,y;\sigma_u^2)$$

where the cost function F $(x,y; \sigma_u^2)$ is defined as follows:

$$F(x,y;\sigma_u^2) = \ln\sigma_u^2 + \ln|r_L(x,y)| + \frac{1}{\sigma_u^2}[L-m_L(x,y)]^T r_L^{-1}(x,y)[L-m_L(x,y)]$$

and $$m_L(x,y) = [\mu_L^1(x,y),\ldots,\mu_L^N(x,y)]^T$$

$$\mu_L^i(x,y) = -PL^i(d^i(x,y)) - AP^i_{tr}(\psi^i(x,y))$$

$$[r_L(x,y)]_{ij} = \begin{cases} 1 & i=j \\ \rho_u^{i,j}(x,y) & i \neq j \end{cases} i,j=1,\ldots,N,$$

determining the location of a mobile device dependent on the location estimate.

18. A method, comprising:
collecting location information;
selecting at least one of a plurality of different location methods to provide a location estimate said methods comprising using cell identity information; and
providing a location estimate based on the at least one selected location method, wherein a location estimate is provided using the following algorithm
calculate the total attenuation experienced by a signal transmitted by the i-th BTS while propagating toward a mobile station where the i-th level observation is $L^i$ by subtracting from the i-th measured received power, $P^i_r$, the maximum power radiated by the i-th BTS, $P^i_{t,max}$:

$$L^i = P^i_r - P^i_{t,max}; i=1,\ldots,N$$

stack level observations from N BTS's in vector L:

$$L=[L^1,\ldots,L^N]^T$$

solve the minimization problem:

$$\begin{bmatrix} \hat{x} \\ \hat{y} \end{bmatrix} = \arg\min_{\begin{bmatrix} x \\ y \end{bmatrix} \in D_{xy}} F(x,y)$$

where the cost function F(x,y) is defined as follows:

$$F(x,y) = \sum_{i=1}^N (L^i + PL^i(x,y) + AP^i_{tr}(x,y))^2$$

and $D_{xy}$ is the domain of existence of x and y/
calculate $\hat{\sigma}_u^2$ as $$\hat{\sigma}_u^2 = F(\hat{x},\hat{y})$$

determining the location of a mobile device dependent on the location estimate.

19. A method, comprising:
collecting location information;
selecting at least one of a plurality of different location methods to provide a location estimate said methods comprising using cell identity information; and
providing a location estimate based on the at least one selected location method,
wherein a location estimate is provided using the following algorithm:
calculate the total attenuation experienced by a signal transmitted by the i-th BTS while propagating toward a mobile station where the i-th level observation is $L^i$) by subtracting from the i-th measured received power, Pt, the maximum power radiated by the i-th BTS, $P^i_{t,max}$:

$$L^i = P_r^i - P_{t,max}^i; i=1,\ldots,N$$

calculate the j-th level difference observation by subtracting the j-th level observation from the level observation $L^1$ taken as reference:

$$D^j = L^1 - L^j; j=2,\ldots,N$$

stack the N-1 difference of level observations in a vector D:

$$D=[D^2,\ldots,D^N]^T$$

solve the minimization problem $$\begin{bmatrix}\hat{x}\\\hat{y}\end{bmatrix} = \arg\min_{\begin{bmatrix}x\\y\end{bmatrix}\in D_{xy}} F(x,y)$$

where $$F(x,y) = \sum_{j=2}^N (D^j - \mu_D^j(x,y))^2 - \frac{1}{N}\left(\sum_{j=2}^N D^j - \mu_D^j(x,y)\right)^2$$

and $$\mu_D^j(x,y) = -[PL^1(d^1(x,y)) - PL^j(d^j(x,y))] - [AP_{tr}^1(\psi^1(x,y)) - AP_{tr}^j(\psi^j(x,y))]$$

$D_{xy}$ is the domain of existence of x and y,
determining the location of the mobile device dependent on the location estimate.

20. A method, comprising:
collecting location information;
selecting at least one of a plurality of different location methods to provide a location estimate said methods comprising using cell identity information; and
providing a location estimate based on the at least one selected location method,
wherein a location estimate is provided using an algorithm solving the following equation in x and y:

$$\begin{cases}\sum_{i=1}^N F^i(x,y)(x-x^i) = 0\\\sum_{i=1}^N F^i(x,y)(y-y^i) = 0\end{cases}; (x,y) \in \mathcal{D} \text{ where}$$

$$F^i(x,y) = \frac{2B^i/C^i(d_0)}{(2\pi)^{3/2}\sigma_u^i \ln 10}$$

-continued $$\frac{\exp\left\{-\frac{1}{2\sigma_u^{i2}}(B^i\log_{10}d^i(x,y) - z^i + A^i)^2\right\}}{[d^i(x,y)]^4} \cdot$$

$$\left[\frac{B^i(B^i\log_{10}d^i(x,y) - z^i + A^i)}{2\sigma_u^{i2}\ln 10} - 1\right],$$

determining the location of a mobile device dependent on the location estimate.

21. A method, comprising:
collecting location information;
selecting at least one of a plurality of different location methods to provide a location estimate said methods comprising using cell identity information; and
providing a location estimate based on the at least one selected location method,
wherein a location estimate is provided using an algorithm solving the following equation in x and y:

$$\begin{cases}\sum_{i=1}^N\left[-\frac{\mathcal{I}_i}{|R|}(x-x^i) - \frac{(\tilde{\mathcal{I}}_i-1)}{|R|}\{(x^i)^2 x - x^i y^i(y-y^i)\}\right] = 0\\\sum_{i=1}^N\left[-\frac{\mathcal{I}_i}{|R|}(y-y^i) - \frac{(\tilde{\mathcal{I}}_i-1)}{|R|}\{(y^i)^2 y - x^i y^i(x-x^i)\}\right] = 0\end{cases};$$

$(x,y) \in \mathcal{D}$, determining the location of a mobile device dependent on the location estimate.

22. A method, comprising:
collecting location information;
selecting at least one of a plurality of different location methods to provide a location estimate said methods comprising using cell identity information; and
providing a location estimate based on the at least one selected location method,
wherein a location estimate is provided using an algorithm based on the following equation in x and y:

$$\hat{x} = \frac{\sum_{i=1}^N \frac{x^i}{\mathcal{I}_{i0}}}{\sum_{i=1}^N \frac{1}{\mathcal{I}_{i0}}}; \hat{y} = \frac{\sum_{i=1}^N \frac{y^i}{\mathcal{I}_{i0}}}{\sum_{i=1}^N \frac{1}{\mathcal{I}_{i0}}}; (\hat{x},\hat{y}) \in \mathcal{D},$$

determining the location of a mobile device dependent on the location estimate.

23. A method as claimed in claim 1, wherein said location estimate is provided by one of a iterative and a closed form method.

24. A method as claimed in claim 1, wherein said location estimate is provided by one of a linear and non linear method.

25. A system, comprising:
collecting means for collecting location information;
selecting means for selecting at least one of a plurality of different location methods to provide a location estimate said methods using cell identity information;
location determining means for determining a first location estimate of a mobile device based on the at least one selected location method, said first location estimate being based on a serving base transceiver station; and estimate determining means for determining a virtual base station estimate, using one of said different location methods, said virtual base station estimate being determined based on the first location estimate of the mobile device and direction information of the serving base transceiver station; and providing means for providing a second location estimate based on at least one of the first location estimate and the virtual base station estimate, said second location estimate being an estimate of the location of the mobile device.

26. A system, comprising:

a collector configured to collect location information;

a selector configured to select at least one of a plurality of different location methods to provide a location estimate, said methods using cell identity information;

a determiner configured to determine a first location estimate of a mobile device based on the at least one selected location method, said first location estimate being based on a serving base transceiver station, and further configured to determine a virtual base station estimate using at least some of the collected location information, said virtual base station estimate being determined based on the first location estimate of the mobile device and direction information of the serving base transceiver station; and a provider configured to provide a second location estimate, using one of said different location methods based on the first location estimate and the virtual base station estimate, said second location estimate being an estimate of the location of the mobile device.

27. Apparatus, comprising:

a collector configured to collect location information;

a selector configured to select at least one of a plurality of different location methods to provide a location estimate, said methods using cell identity information;

a determiner configured to determine a first location estimate of the apparatus based on the at least one selected location method, said first location estimate being based on a serving base transceiver station and further configured to determine a virtual base station estimate based on the first location estimate of the apparatus and direction information of the serving base transceiver station; and a provider configured to provide a second location estimate, using one of said different location methods based on the first estimate and the virtual base station estimate, said second location estimate being an estimate of the location of the apparatus.

28. A computer program embodied on a computer readable medium, said computer program configured to control a processor to perform:

collecting location information;

selecting at least one of a plurality of different location methods to provide a location estimate said location methods comprising using cell identity information;

determining a first location estimate of a mobile device based on the at least one selected location method, said first location estimate being based on a serving base transceiver station;

determining a virtual base station estimate using at least some of the collected location information, said virtual base station estimate being determined based on the first location estimate of the mobile device and direction information of the serving base transceiver station; and providing a second location estimate using one of said different location methods based on the first location estimate and the virtual base station estimate, said second location estimate being a location of the mobile device.

* * * * *